(12) United States Patent
Fink et al.

(10) Patent No.: US 9,715,609 B1
(45) Date of Patent: Jul. 25, 2017

(54) SYSTEMS, APPARATUSES AND METHODS FOR BEAMFORMING RFID TAGS

(71) Applicant: The United States of America as represented by the Administrator of the National Aeronautics and Space, Washington, DC (US)

(72) Inventors: Patrick W. Fink, Missouri City, TX (US); Gregory Y. Lin, Friendswood, TX (US); Phong H. Ngo, Friendswood, TX (US); Timothy F. Kennedy, Houston, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 349 days.

(21) Appl. No.: 14/201,402

(22) Filed: Mar. 7, 2014

Related U.S. Application Data

(60) Provisional application No. 61/775,871, filed on Mar. 11, 2013.

(51) Int. Cl.
| | | |
|---|---|---|
| *G06K 7/10* | (2006.01) | |
| *G06K 7/00* | (2006.01) | |
| *H01Q 1/22* | (2006.01) | |
| *H04B 7/0408* | (2017.01) | |

(52) U.S. Cl.
CPC ....... *G06K 7/10366* (2013.01); *G06K 7/0008* (2013.01); *H01Q 1/2208* (2013.01); *H04B 7/0408* (2013.01)

(58) Field of Classification Search
None
See application file for complete search history.

(56) References Cited

U.S. PATENT DOCUMENTS

| | | | |
|---|---|---|---|
| 4,996,532 A * | 2/1991 | Kirimoto | G01S 7/36 342/17 |
| 7,183,922 B2 | 2/2007 | Mendolia et al. | |
| 7,187,288 B2 | 3/2007 | Mendolia et al. | |
| 7,456,726 B2 | 11/2008 | Hansen et al. | |
| 7,573,418 B2 | 8/2009 | Kawai et al. | |
| 7,667,652 B2 | 2/2010 | Gevargiz et al. | |
| 7,786,864 B1 | 8/2010 | Shostak et al. | |
| 7,873,326 B2 | 1/2011 | Sadr | |
| 7,911,324 B2 | 3/2011 | Breed et al. | |
| 8,072,311 B2 | 12/2011 | Sadr et al. | |
| 8,120,532 B2 | 2/2012 | Rofougaran | |
| 2005/0148370 A1 * | 7/2005 | Moldoveanu | H01Q 1/246 455/562.1 |

(Continued)

*Primary Examiner* — Mohamed Barakat
(74) *Attorney, Agent, or Firm* — Kurt G. Hammerle

(57) ABSTRACT

A radio frequency identification (RFID) system includes an RFID interrogator and an RFID tag having a plurality of information sources and a beamforming network. The tag receives electromagnetic radiation from the interrogator. The beamforming network directs the received electromagnetic radiation to a subset of the plurality of information sources. The RFID tag transmits a response to the received electromagnetic radiation, based on the subset of the plurality of information sources to which the received electromagnetic radiation was directed. Method and other embodiments are also disclosed.

22 Claims, 11 Drawing Sheets

(56) References Cited

U.S. PATENT DOCUMENTS

| | | | |
|---|---|---|---|
| 2005/0280504 A1* | 12/2005 | Pettus | G06K 19/0672 340/10.1 |
| 2006/0055531 A1 | 3/2006 | Cook et al. | |
| 2007/0001811 A1* | 1/2007 | Kiyohara | H01Q 1/2216 340/10.1 |
| 2007/0222610 A1* | 9/2007 | Tagato | G06K 19/07336 340/572.7 |
| 2010/0109903 A1* | 5/2010 | Carrick | G01S 5/14 340/8.1 |
| 2011/0160941 A1* | 6/2011 | Garrec | G01S 13/913 701/17 |

* cited by examiner

SYSTEMS, APPARATUSES AND METHODS FOR BEAMFORMING RFID TAGS

CROSS-REFERENCE TO RELATED APPLICATIONS

This application claims priority to U.S. Provisional Application Ser. No. 61/775,871 titled "Systems and Methods for Beamforming RFID Tags," filed on Mar. 11, 2013, and is incorporated herein in its entirety by reference.

ORIGIN OF THE INVENTION

The invention described herein was made by employees of the United States government and may be manufactured and used by or for the government of the United States of America for governmental purposes without the payment of any royalties thereon or therefor.

FIELD OF THE DISCLOSURE

The embodiments described herein relate generally to the field of radio frequency identification ("RFID"). More particularly, the disclosure relates to systems, apparatuses and methods involving RFID tags that utilize beamforming.

BACKGROUND

RFID technology may be used, for example, to ascertain the position of objects, to track assets, or to assist in navigation. In this technology, electromagnetic radiation may be transmitted between an RFID tag and an RFID interrogator according to any of various arrangements, and the RFID interrogator determines the presence or position of the RFID tag (or the object to which the RFID tag is affixed) by decoding of information contained in the electromagnetic signal received from the RFID tag. With conventional RFID technology, an RFID tag may use either a wide beam antenna or a narrow fixed beam antenna. Use of a wide beam antenna results in wide distribution of the electromagnetic radiation transmitted by the RFID tag, or in other words, a wide angular extent of coverage, but concomitantly the energy is not focused and consequently the range of communication (linear extent or maximum distance within which communication can be conducted) between tag and interrogator is limited. Use of a narrow fixed beam antenna results in a focused beam and hence a long range, but concomitantly is restricted to a narrow angle of coverage such that communication between tag and interrogator is limited: the tag must be pointed in the direction of the interrogator in order to communicate with the interrogator; if the interrogator is off to the side, beyond the angular extent of coverage, the tag and interrogator cannot communicate. Thus, there is a trade-off between linear extent and angular extent of coverage.

SUMMARY

Embodiments disclosed herein provide systems, methods, and apparatuses for beamforming RFID tags.

According to a first aspect of the disclosure, a radio frequency identification (RFID) system is provided, including an RFID tag. The RFID tag includes a plurality of information sources and a beamforming network. The RFID tag is configured to receive electromagnetic radiation, the beamforming network is configured to direct the received electromagnetic radiation to a subset of the plurality of information sources, and the RFID tag is configured to transmit a response to the received electromagnetic radiation, the response being based on the subset of the plurality of information sources to which the received electromagnetic radiation was directed.

According to a second aspect of the disclosure, a radio frequency identification (RFID) system is provided, including an RFID tag. The RFID tag includes a plurality of information sources and a beamforming network. The RFID tag is configured to transmit electromagnetic radiation via the beamforming network, the electromagnetic radiation encoding one or more identification codes, each identification code identifying one of the plurality of information sources, respectively.

According to a third aspect of the disclosure, a radio frequency identification (RFID) method is provided. The RFID method includes receiving electromagnetic radiation, directing the received electromagnetic radiation to a subset of a plurality of information sources within an RFID tag, and transmitting a response to the received electromagnetic radiation. The response is based on the subset of the plurality of information sources to which the received electromagnetic radiation was directed.

According to a fourth aspect of the disclosure, a radio frequency identification (RFID) method is provided. The RFID method includes transmitting electromagnetic radiation, the electromagnetic radiation encoding one or more identification codes, each identification code identifying a respective one of a plurality of information sources within an RFID tag.

Other aspects and advantages of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

NOTATION AND NOMENCLATURE

Figure 1:
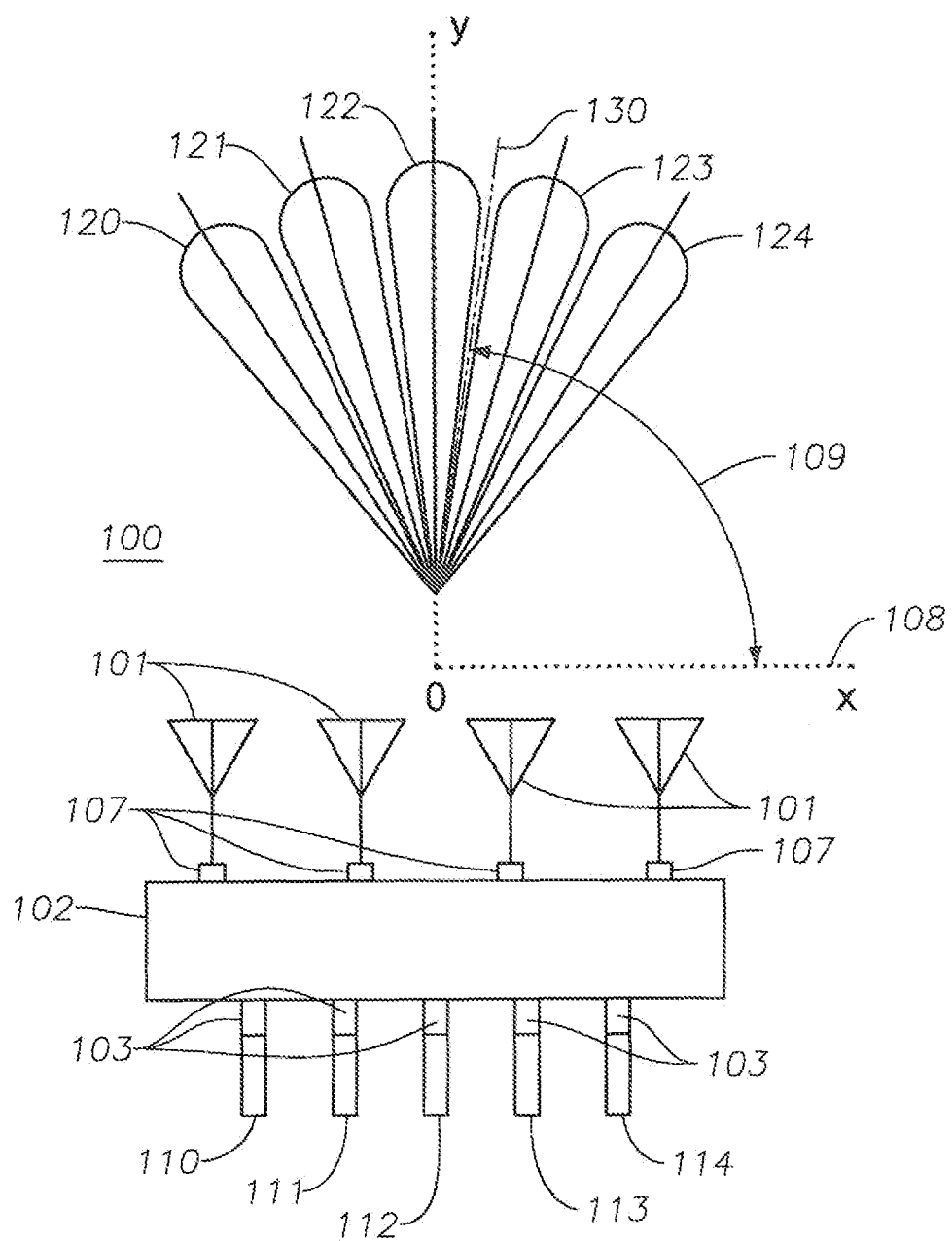
FIG. 1 is a schematic diagram, in accordance with one or more embodiments described herein, of a beamforming RFID tag.

Certain terms are used throughout the following description and claims to refer to particular system components and configurations. As one skilled in the art will appreciate, the same component may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . ." The word "or" is used in the inclusive sense (i.e., "and/or") unless a specific use to the contrary is explicitly stated.

It should be noted that the terms "radio frequency" (RF) and "microwave" are used interchangeably herein. "Interrogator" and "reader" are likewise used interchangeably to connote a transceiver that transmits electromagnetic radiation to one or more RFID tags and receives responses from the one or more RFID tags. While the interrogator may be operationally coupled to one or more processors, such processors may be internal and/or external to the interrogator. For example, in some cases the interrogator may have an internal or embedded processor that controls the functionality of the interrogator and is also capable of decoding and utilizing information received from one or more tags. In other cases, the interrogator might have an internal or embedded processor that controls the communication functionality of the interrogator, and an interface to an external processor enables the external processor to utilize information received from the one or more tags.

In the case of surface acoustic wave (SAW) RFID tags, the functionality of the SAW tag upon the acoustic wave energy, which has been converted from electromagnetic energy by a transducer that imparts information to that acoustic energy, is an encoding process that is also considered a type of passive modulation. Hence, the terminology "encoding" and "modulation" of the signal with respect to SAW devices is used interchangeably, and when used in a general sense, it is understood that "modulation" implies the passive modulation or encoding characteristic of SAW devices.

Although there is not unanimous concurrence regarding the definition of "waveguides" and "transmission lines," the consensus opinion is that transmission lines are a subset of waveguides that propagate, predominantly, transverse electromagnetic (TEM) waves. Herein, the term "transmission line" is used in a more general sense to denote an elongated device for transferring electromagnetic energy between two pieces of equipment, a practice well known to those skilled in the art of electromagnetic engineering (having benefit of this disclosure), regardless of the specific propagation modes established within the elongated device. Although the term "waveguide" sometimes is construed to mean a hollow elongated, usually conductive, tube, the intent in this document is the more general meaning relating to any structure designed to propagate an electromagnetic field in one or more intended directions.

The terms "pattern," "antenna pattern," "(antenna) radiation distribution pattern" or the like used herein pertain to the radiation distribution produced over a solid angular region by injecting electromagnetic energy within a specific operating frequency band or set of operating frequency bands into one of the terminal ports (described below). The pattern may comprise one or more primary beams, wherein "beam" is used to denote a pattern of radiation density over an angular span that contains a peak radiation density, and "beam" can also be described as a major lobe. In some embodiments described herein, a pattern associated with a terminal port might contain multiple lobes or beams, each lobe or beam characterized by a local maximum of radiation density.

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. Relatedly, certain features may be omitted in certain figures, and this omission may not be explicitly noted in all cases.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impractical to include all of the possible embodiments and contexts of the invention in this disclosure. Upon reading this disclosure, many alternative embodiments will be apparent to persons of ordinary skill in the art. The scope of the invention is defined by the appended claims and equivalents thereof.

Illustrative embodiments of the invention are described below. In the interest of clarity, not all features of an actual implementation are described or illustrated in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure.

Embodiments disclosed herein may provide certain advantages and benefits, such as described as follows. The beamforming RFID tags described herein may permit links (communication) between interrogators and tags over longer distances at a fixed interrogator transmission power, or over the same distance at a lesser interrogator transmission power, than is typically feasible in conventional RFID communication links. Thus, the beamforming RFID tags may permit tracking of assets over greater distances. Navigation or localization applications are also possible due to the multiple, angle-dependent beams associated with the beamforming RFID tags. Long range wireless sensor interrogation applications are also possible when the tag incorporates one or more sensing mechanisms.

More specifically, the beamforming RFID tags described herein may provide antenna directivity that far surpasses typical values associated with RFID tag antennas. The beamforming RFID tags described herein may also provide retro-directive functionality, which simulates automated passive steering, such that the signal received from the interrogator is focused on a specific RFID tag and retransmitted back in the direction of the interrogator. Accordingly, the beamforming RFID tags described herein may be referred to as beamformer RFID retro-reflector tags. In addition to the range information associated with typical RFID links, bearing information may also be provided to the interrogator, based on the identification information in the signal that is reflected back to the interrogator. That is, the beamforming RFID tag may have the ability to associate a unique identification code to each beam port, so that the identification code contained in the response signal transmitted by the tag indicates the angle of transmission. This provision of bearing information permits enhanced navigation functionality; e.g., road signs that return bearing estimation in addition to the typically provided range and possibly range-rate. Further, the beamformer (or beamforming network) in the beamforming RFID tags described herein may spatially condense the power of the incoming electromagnetic radiation (signal) to essentially a point that may be referred to as a beam port (or terminal port). The condensing of power at the beam port makes this RFID retro-reflector technology suitable for use not only with surface acoustic wave circuits but also with integrated circuit-based RFID tags, which require a minimum threshold voltage at the integrated circuit because the integrated circuit is powered by the rectified field. The increased power permits longer communication links.

A general description of some embodiments disclosed herein is given immediately below, followed by a description of embodiments with reference to the figures herein.

Methods, apparatuses, and systems for long-range RFID-enabled communication, tracking and other functions, using beamforming RFID tags, are disclosed, including an RFID system comprising (i) an interrogator operationally connected to a processor and (ii) one or more beamforming RFID tags. Each of the beamforming RFID tags comprises one or more antennas (e.g., an antenna array), one or more terminal port circuits, and a beamforming network. The beam forming network comprises one or more antenna ports connecting to the one or more antennas and one or more terminal ports connecting to the one or more terminal port circuits. Each of the terminal port circuits comprises one or more RFID information sources. In some embodiments, the information sources are RFID integrated circuits that are powered by rectifying incident electromagnetic energy. In some embodiments, the information sources are surface acoustic wave (SAW) circuits that receive RF energy and transmit encoded RF pulses that are received by the interrogator and decoded by the processor to derive the identification of the one or more information sources responding. The responding terminal port circuits, and the information sources associated with the responding terminal port circuits, are determined by (i) the angle of incidence of the electromagnetic wave impinging on the antennas, relative to a coordinate reference system defined in terms of the antennas' positions and orientations, and (ii) the design of the beamforming network. The beamforming RFID tags are characterized by a fixed characteristic set of antenna radiation distribution patterns (e.g., beams), each such radiation distribution pattern being associated with one or more of the terminal ports of the beamforming network, and each radiation distribution pattern determined by the location of the antennas connected to the beamforming network and by the design of the beamforming network. In some embodiments, the beamforming RFID tags are able to receive more power by using multiple antennas to achieve a higher effective directivity.

In an embodiment, the terminal port circuits include sensors attached to one or more of the RFID information sources so that the processor of the RFID system receives sensor telemetry in addition to the identification information associated with the information source. In another embodiment, the RFID information sources are inherently integrated with a sensor modality, such as SAW circuits for which temperature telemetry, in addition to the identification code, is derived by the processor of the RFID system.

In some embodiments, the beamforming network is a Rotman lens. In some embodiments the beamforming network is a Ghent lens. In some embodiments, the beamforming network comprises RF dividers and combiners. In some embodiments, the beamforming network is a matrix of transmission lines and hybrid couplers. In some embodiments, the matrix of transmission lines and couplers is a Butler matrix. In some embodiments, a matrix of transmission lines and directional couplers forms a Blass beamforming network.

In some embodiments, a multi-faceted structure supports a beamforming RFID tag on each face, and the beamforming RFID tag on each face provides antenna coverage over a predetermined angular span such that the collective beamforming RFID tags over the multi-faceted structure provide coverage over a predetermined angular span that exceeds the span of the composite of the single antenna beams associated with a single face.

In some embodiments, a beamforming RFID tag is formed from a multi-faceted structure in which each face supports a fixed beam antenna with an associated antenna beam, each fixed beam antenna being connected to an RFID information source such that the multiple antenna beams associated with multiple faces provide coverage over a predetermined angular span that exceeds the span of any of the single antenna beams associated with a single face.

In some embodiments, the processor operationally connected to the interrogator is configured to estimate the angle of the RFID tag antenna array relative to the direction in which the interrogator is transmitting based on the identification of the responding information sources. In some embodiments, a constellation of one or more beamforming RFID tags are arranged and surveyed so that the position and orientation of each is known. A mobile platform with an RFID system radiates RF signals to the one or more beamforming RFID tags and the processor operationally connected to the interrogator is configured to estimate the position and/or orientation of the mobile platform based on the identification of the information sources responding from the constellation of one or more beamforming RFID tags.

In some embodiments of the beamforming RFID tag, the information sources attached to the terminal ports of the beamforming network are battery powered transmitters that send out RF pulses, and each information source is transmitted through one or more beams, each beam covering a specified angular region according to the beamformer design. In some embodiments, the battery powered transmitters are ultra-wideband (UWB) transmitters. In some embodiments, sensors are attached to one or more of the information sources so that the transmitted information over the multitude of beams contains sensor telemetry in addition to the identification associated with the information source.

FIG. 1 depicts one or more embodiments described herein as a beamforming RFID tag 100 comprising multiple antennas 101 (four shown), a beamforming network 102 with multiple antenna ports 107 (four shown) and multiple terminal ports 103 (five shown), and multiple terminal port circuits 110, 111, 112, 113 and 114. Antenna ports 107 couple antennas 101 to beamforming network 102, and terminal ports 103 couple terminal port circuits 110, 111, 112, 113 and 114 to beamforming network 102. The numbers of antennas 101, antenna ports 107, terminal ports 103 and terminal port circuits 110-114 may vary from the numbers illustrated in FIG. 1, the numbers of each of these elements may be two or more, the number of antennas 101 may match the number of antenna ports 107, and the number of terminal ports 103 may match the number of terminal port circuits 110-114.

The beamforming RFID tag 100 may be said to have a (fixed) characteristic set of antenna radiation distribution patterns, illustrated in FIG. 1 in a simplified manner in the form of single beams or major lobes 120, 121, 122, 123 and 124. In some embodiments, RFID tag 100 may have antenna radiation distribution patterns of types different from those illustrated in FIG. 1. The antennas 101 may receive electromagnetic radiation, e.g., an RF signal 130 that has been transmitted by an RFID interrogator (not shown) at a given angle of incidence 109 relative to a fixed coordinate system or frame of reference defined by the position and orientation of the antennas 101, such as Cartesian coordinate system 108 defined by an x-axis and a y-axis intersecting at origin O (0,0). The antennas 101 may transfer the received signal 130 via the multiple antenna ports 107 to beamforming network 102. Beamforming network 102 may focus the power (direct the received electromagnetic radiation) to a selected one or more of the terminal ports 103 (and hence to a selected one or more of the corresponding terminal port circuits 110-114 and corresponding information sources contained therein, described below), in accordance with the angle of incidence 109 of the signal 130 relative to the array of antennas 101. While the selected one or more of the terminal ports 103/terminal port circuits 110-114/information sources may be referred to as a "subset" of the terminal ports 103/terminal port circuits 110-114/information sources, it is to be understood that such subset may be either a proper subset, or an improper subset including the entire set of the terminal ports 103/terminal port circuits 110-114/ information sources. If the angle of incidence 109 is aligned well with a single one of the characteristic antenna radiation distribution patterns, or beams, 120-124 of the beamforming RFID tag 100, then according to at least one embodiment the signal 130 power is directed predominantly to the one of the terminal port circuits 110-114 that corresponds to the single (aligned) one of the beams 120-124. If the angle of incidence 109 of the signal 130 is within two or more of the beams 120-124 of the beamforming RFID tag 100, then according to at least one embodiment, the signal 130 power is distributed between the two or more of terminal port circuits 110-114 that correspond to the two or more of the beams 120-124. It is noted there is not necessarily a fixed mapping between a given one of the beams 120-124 of the characteristic antenna radiation distribution set and a given one of the terminal port circuits 110-114, or a unique mapping between the beams 120-124 and the terminal port circuits 110-114. However, in many embodiments, the beamforming network 102 is designed such that each of the major beams 120-124 of the characteristic antenna radiation distribution set is associated with only one of the terminal port circuits 110-114 (and hence with the corresponding information source contained therein), where "associated" means that energy received over that beam is predominantly directed to the one associated port, and by reciprocity of the beamforming network 102 and the array of antennas 101, electromagnetic energy transmitted into that port is radiated predominantly through only the one associated beam of the characteristic set of antenna radiation distribution patterns. It is further noted that, while beamforming network 102 may focus or direct the received electromagnetic radiation to a selected one or more terminal ports 103/terminal port circuits 110-114/information sources, it may occur that (some of) the non-selected, or non-preferred, one(s) of the terminal ports 103/terminal port circuits 110-114/information sources also receive sufficient signal power to permit response to the interrogator due to the well-known fact that the directivity or focusing quality of beamforming networks is finite, as well as to unintended scattering that occurs in beamforming networks. The likelihood of occurrences of non-selected, or non-preferred, terminal ports 103/terminal port circuits 110-114/information sources receiving sufficient signal power to permit response to the interrogator is likely to increase in situations in which the RF link is exceptionally strong, such as when the range between the interrogator and tag is very close or when the interrogator is transmitting a much higher level of power than is needed to permit communication with only the selected, or preferred, terminal ports 103/terminal port circuits 110-114/information sources.

Each one of the terminal port circuits 110-114 includes an information source (illustrated in FIGS. 2-4) that, after receiving an incident signal (i.e., a signal directed thereto by the beamforming network 102), transmits a modulated or encoded form of the incident signal back into the beamforming network 102, the modulated or encoded signal containing information. Due to reciprocity, the beamforming network 102 redistributes the encoded or modulated signal power back to the antennas 101 with relative time delays such that the signal is transmitted back at the angle of incidence (at which the signal was initially received) and in the direction opposite the direction from which the signal initially arrived at the RFID tag 100, that is, in the approximate direction of the interrogator that initially sent the signal to the RFID tag 100. (The "direction from which the signal initially arrived at the RFID tag 100" may be thought of in terms of a vector oriented at the angle of incidence and directed away from the interrogator and toward the tag (compare signal 235 in FIG. 5, discussed below) and "the direction opposite the direction from which the signal initially arrived at the RFID tag 100" may be thought of in terms of a vector oriented at the same angle and directed away from the tag and toward the interrogator (compare signal 236 in FIG. 6, discussed below). In this regard, the response from each one of the terminal port circuits 110-114 is radiated back to the interrogator according to the fixed antenna radiation distribution pattern associated with the respective one of the terminal port circuits 110-114. The interrogator may then receive this response signal (electromagnetic radiation) that has been transmitted back to the interrogator by the RFID tag 100. Each information source may include an identification code. In at least one embodiment, each information source is an RFID integrated circuit capable of responding with such identification code identifying the particular information source (i.e., capable of encoding the response signal with such identification code). In at least one embodiment, each information source includes an RFID integrated circuit and a sensor and is capable of responding (i.e., encoding the response signal) with such an identification code and sensor telemetry. In at least one embodiment, each information source includes a SAW RFID tag (inherently integrated with a sensor modality) that encodes the response signal with such an identification code and, optionally, sensor telemetry. The interrogator may be associated with a mapping between the identification codes of the information sources and angles at which the responses are transmitted by the RFID tag. The interrogator may also be associated with logic for deriving, from the response signal, information pertaining to a position and/or an orientation of the interrogator and/or tag, as described in fuller detail below.

As will be understood from the above, the particular information sources (or particular terminal port circuits 110-114) to which a given incoming signal 130 (signal 130 arriving at the tag 100) is directed by the beamforming network 102 may be determined by (selected in accordance with) the angle of incidence 109 of the incoming signal 130. Also, the information sources to which a given incoming signal 130 is directed may be the information sources that respond to the incoming signal, sending a response to the incoming signal 130 back to the interrogator. Thus, the particular information sources that respond to the incoming signal 130 may also be determined by (selected in accordance with) the angle of incidence 109 of the incoming signal 130. Thus, the response signal received by the interrogator from the RFID tag may include (i.e., be encoded with) one or more identification codes identifying the particular information source(s) to which the initial signal (transmitted by the interrogator to the RFID tag 100) was directed and from which the response (from tag 100 to interrogator) was transmitted. In this sense the response signal may be based on the particular information sources to which the received signal was directed by the beamforming network 102. As will be understood, the response signal may depend on the angle of incidence 109 of the incoming signal and on the design of the beamforming network 102.

The design of beamforming networks will now be described. Typically, a beamforming network is designed to implement, in conjunction with attached antennas, a fixed set of characteristic beams such as beams 120, 121, 122, 123 and 124, which in FIG. 1 are shown superimposed upon Cartesian coordinate system 108. The set of characteristic beams, or radiation distribution pattern, is determined by the design of the antennas, the locations of the antennas 101, and the design of the beamforming network 102. As noted, FIG. 1 is schematic, and those skilled in the art now having benefit of this disclosure will understand that in reality beam patterns may have additional side lobes, for example. Moreover, in at least one embodiment, the beamformer 102 and the spacing between antennas 101 are designed such that the antenna radiation distribution pattern associated with one or more of the terminal ports 103/terminal port circuits 110-114 exhibits multiple main lobes or beams, such as are commonly referred to as grating lobes in the art of antenna arrays. In at least one embodiment, the antennas 101 are collinear, although this need not (but may) be the case in other embodiments. Each of the terminal ports 103 (and corresponding terminal port circuit and information source) may be associated with one or more of the characteristic beams 120-124. In this disclosure, the association of terminal ports 103 and beams 120-124 is intended to imply that an RF excitation at a specific terminal port 103 produces radiation predominantly through the one or more associated ones of the characteristic beams 120-124. For example, in one embodiment consistent with FIG. 1, terminal port circuit 110 (and corresponding information source) may be associated uniquely with characteristic beam 120, terminal port circuit 111 (and corresponding information source) may be associated uniquely with beam 121, terminal port circuit 112 (and corresponding information source) may be associated uniquely with beam 122, terminal port circuit 113 (and corresponding information source) may be associated uniquely with beam 123, and terminal port circuit 114 (and corresponding information source) may be associated uniquely with beam 124. (It is noted that in such one-to-one association of characteristic beams with terminal port circuits, the pairing of the characteristic beams and the terminal port circuits need not accord with their left-to-right or right-to-left ordering, e.g., beam 120 could be associated with a terminal port circuit other than 110, etc.) Since reciprocity applies to this passive beamforming network 102 and the attached antennas 101, radiation received in a specific direction will result in the beamforming network 102 directing the received power toward the particular ones of the terminal ports 103 that are associated with the one or more of the beams 120-124 that are directed in that specific direction. The design of the characteristic beam set of the beamforming network 102 permits infinite degrees of freedom with respect to the primary direction and spacing of the beams 120-124, in addition to infinite degrees of freedom with respect to the coupling of the beams 120-124 to specific ones of the terminal ports 103/terminal port circuits 110-114, and with respect to the number of beams and antenna ports. Such functionality of beamforming networks is well known to those skilled in the art now having benefit of this disclosure.

As also seen in FIG. 1, beam overlap can vary. For example, beam 122 is depicted as having less overlap with beams 121 and 123 as compared to the overlap between beams 120 and 121 and to the overlap between beams 123 and 124. In at least one embodiment, the beamforming network 102 is designed such that the beams overlap sufficiently that the beamforming RFID tag 100 is capable of communicating with an interrogator over the entire range of angles covered by the characteristic beam set. In FIG. 1, this range would include the entire span from the beam center of beam 120 to the beam center of beam 124, through all the beams between beams 120 and 124, in addition to the spans from the beam centers of beams 120 and 124 to the respective limiting angles on the outside of beams 120 and 124, where "limiting angle" is defined as the angle at which the minimum antenna gain required to permit the communication link between the interrogator and the beamforming RFID tag 100 is obtained. (The term "limiting angle" need not be restricted in use to beams at the extremes of a set of beams, but may be applied to other beams, for example, in the case of beams that do not sufficiently overlap to provide for continuous coverage.) It is noted that the "limiting angle" is dependent upon several parameters of the link between the interrogator and the tag 100, including but not limited to the transmit power of the interrogator and the propagation environment surrounding the interrogator and the tag 100. When an incident signal arrives at an angle at which two beams intersect, within (inside) the limiting angles of both beams, the terminal ports 103 associated with both beams may receive the incoming power, and likewise the signal returned from both terminal ports 103 may be reradiated at substantially the same angle on the same two beams. It should be noted that the overlap of beams and the distribution of incoming power to more than one terminal port, and hence to more than one information source, does not necessarily lead to simultaneous transmission from each of the receiving terminal ports and information sources. In fact, in at least one embodiment, the information sources comprise RFID integrated circuits that avoid tag collisions (interference between simultaneous tag transmissions) through timing of tag responses dictated by a communication protocol such as the EPCglobal Class 1 Generation 2 UHF protocol. In such a protocol, the RFID integrated circuits may be singulated through a protocol known as an "Aloha" procedure in which only one tag responds at a time.

It will readily be recognized by those skilled in the art of beamforming networks, now having benefit of this disclosure, that there are a number of types of beamforming networks that could be used to implement a beamforming network 102 for application as described herein for a beamforming RFID tag 100. For example, in at least one embodiment, the beamforming network 102 could be a microwave lens. The design of the microwave lens could be any of a number of well known microwave lens designs. For example, in at least one embodiment the microwave lens could be a Rotman lens, as described, for example, in "Wide Angle Microwave Lens for Line Source Applications" by W. Rotman and R. Turner (IEEE Transactions on Antennas and Propagation, vol. 11, issue 6, 1963, pp. 623-632) or in *Phased Array Antennas* by A. K. Bhattacharyya (Wiley-Interscience, ISBN-13: 978-0-471-72757-6, 2006, pp. 379-415), or any of the microwave lens designs derivative of the Rotman lens, as described, for example, in the aforementioned *Phased Array Antennas* (pp. 379-415), in "Procedure for correct refocusing of the Rotman lens according to Snell's law" by D. R. Gagnon (IEEE Transactions on Antennas and Propagation, vol. 37, March 1989, pp. 390-392), or in "Comparison of the Performance of the Rotman Type Lenses Obtained by Different Design Approaches" by P. K. Singhal and R. D. Gupta (TENCON 99, Proceedings of the IEEE Region 10 Conference, vol. 1, 1999, pp. 738-741). In at least one embodiment, the microwave lens could be a lens following design procedures outlined in the aforementioned *Phased Array Antennas* (pp. 379-415) or the aforementioned "Procedure for correct refocusing of the Rotman lens according to Snell's law" (pp. 390-392). In at least one embodiment, the lens could be a derivative of the Rotman lens such that the antenna ports and beam ports are interspersed around a circular region to create a beamforming network capable of providing coverage over 360 degrees, as described in the aforementioned "Comparison of the Performance of the Rotman Type Lenses Obtained by Different Design Approaches" (pp. 738-741). In at least one embodiment, the microwave lens could be a Luneberg lens, or a derivative thereof, as described in "Fan-Beam Millimeter-Wave Antenna Design Based on the Cylindrical Luneberg Lens" by X. Wu and J. Lauren (IEEE Transactions on Antennas and Propagation, vol. 55, no. 8, August 2007, pp. 2147-2156). In at least one embodiment, the beamforming network could be formed from power dividers/combiners, waveguides, and phase shifters, or the beamforming network could be a derivative of such a beamforming network. In at least one embodiment the beamforming network could be formed from hybrid couplers, waveguides, and phase shifters, or the beamforming network could be a derivative of such a beamforming network. In at least one embodiment, the beamforming network could be a Butler matrix, as described in the aforementioned *Phased Array Antennas* (pp. 379-415), or a derivative thereof. In at least one embodiment, the beamforming network could be a Blass matrix, as described in the aforementioned *Phased Array Antennas* (pp. 379-415), or a derivative thereof. In at least one embodiment, the beamforming network could be a Ghent lens, or a derivative thereof, as described in British Provisional Patent Specification No. 25926/56 ("Improvements in or Relating to Electromagnetic-Wave Lens and Mirror Systems," S. S. D. Jones, H. Ghent, and A. A. L. Browne, August, 1956). All of the documents cited in this paragraph are hereby incorporated herein by reference.

It is further recognized by and familiar to those skilled in the art, now having benefit of this disclosure, that the selection of the beamforming network might impose certain constraints. For example, a Butler matrix is more easily implemented if the number of antenna ports is 2 to the power m, where m is a positive integer. The Butler matrix can also be designed such that the beams are orthogonal, as is well known in the art, as described in the aforementioned *Phased Array Antennas* (pp. 379-415). It should be noted that the example shown in FIG. 1 is one of many possible beamforming RFID tag implementations, and that certain selections of beamforming networks might impose constraints that might not be consistent with the operation or number or placement of beams and ports as shown in FIG. 1. For example, beamforming networks created as a Butler matrix, as described in the aforementioned *Phased Array Antennas*

(pp. 379-415), are readily implemented with an even number of antenna ports and terminal ports, although other configurations are possible.

Figure 2:
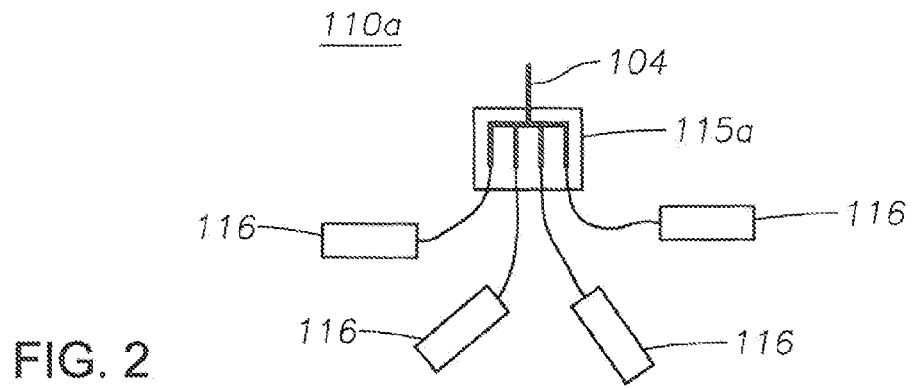
FIG. 2 is a schematic diagram, in accordance with one or more embodiments described herein, of a terminal port circuit with a radio frequency (RF) distribution circuit and multiple RFID information sources.
Figure 3:
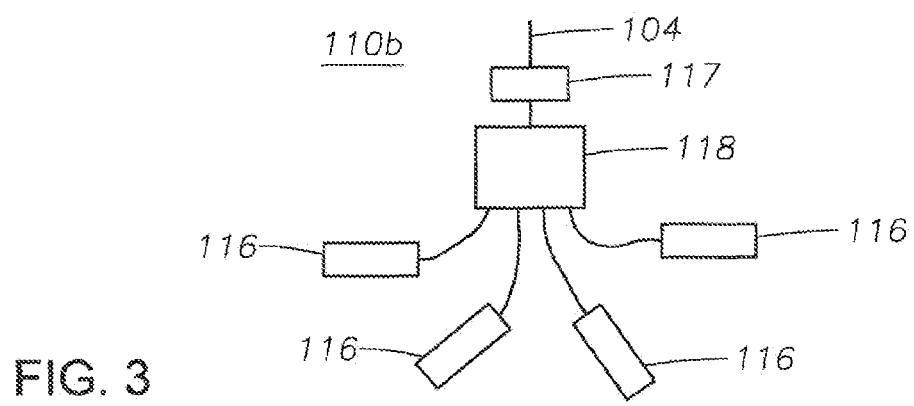
FIG. 3 is a schematic diagram, in accordance with one or more embodiments described herein, of a terminal port circuit with an information source comprising an integrated circuit and multiple sensors.
Figure 4:
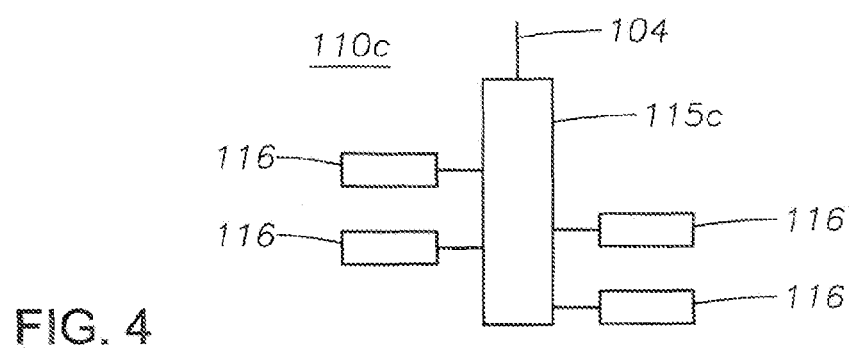
FIG. 4 is a schematic diagram, in accordance with one or more embodiments described herein, of a terminal port circuit with an RF distribution circuit and multiple RFID information sources attached to a waveguide distribution network.

Terminal port circuits 110-114 may be of varying types, some of which are illustrated in FIGS. 2-4, description of which is provided after the general description immediately following. Each one of terminal port circuits 110-114 may include an RF interface (terminal port circuit interface) to the corresponding terminal port, and an RF distribution circuit connected to the RF interface and also connected to one or more information sources. The RF distribution circuit may be, for example, an RF power divider or a distributed waveguide. The information sources may include RFID integrated circuits or SAW circuits and may include one or more sensors of one or more types. The RFID integrated circuit may be attached to the RF interface and include an on-board memory. The RFID integrated circuit may be attached to a data acquisition unit, with one or more sensors attached to a data acquisition unit. In this case, the data acquisition unit may sample one or more of the attached sensors and provide the sensor sample and unique sensor source identification to the RFID integrated circuit, and the RFID integrated circuit may store each sensor sample and unique sensor source identification on the on-board memory, and the RFID integrated circuit may communicate with the interrogator to provide each sensor sample and associated sensor identification number to a processor connected to the interrogator. The RFID integrated circuit may be powered by rectifying the RF signal transmitted by the interrogator. The RFID integrated circuit may be compliant with one or more of the EPCglobal RFID standards. In some embodiments, all the terminal port circuits 110-114 may be the same such that the signal transmitted by the tag is characterized by a single identification code.

In some embodiments the information sources include RFID integrated circuits. In other embodiments, the information sources include SAW circuits. In still other embodiments, some information sources include RFID integrated circuits and others include SAW circuits. The information sources may also include one or more sensors of one or more types (e.g., modalities). The information sources may be powered by a battery and capable of responding to an interrogation signal. The information sources may periodically transmit a signal containing a unique identification. Such signal may include sensor telemetry. Such periodic transmission may occur in the absence of any signal transmitted by an interrogator to the tag.

One type of the terminal port circuits 110-114 is shown in FIG. 2 according to at least one embodiment. Although the terminal port circuit illustrated in FIG. 2 is assigned reference numeral 110a, it may be thought of as representative of any or all of the terminal port circuits 110-114 in RFID tag 100, as all of the terminal port circuits 110-114 may (but need not) be of the same type. Terminal port circuit 110a is a parallel RF terminal port circuit. Terminal port circuit 110a is connected to a terminal port 103 (shown in FIG. 1) of beamforming network 102 (shown in FIG. 1) via terminal port circuit interface 104. Terminal port circuit 110a includes element 115a, which may be an RF power divider (or divider/combiner) or a hybrid coupler, and multiple information sources 116. A signal (referred to herein also as an "incident signal") received by terminal port circuit 110a from beamforming network 102 via terminal port circuit interface 104 is distributed through RF power divider or hybrid coupler 115a to information sources 116. Each information source 116 includes at least one RFID source (not shown), such as an RFID integrated circuit or a SAW circuit, and, in some embodiments, one or more sensors (not shown). According to at least one embodiment, each information source 116 directs an encoded or modulated form of the incident signal back to the terminal port circuit interface 104 for transmission into the beamforming network 102 and back to the interrogator through the antennas 101 (shown in FIG. 1) attached to the beamforming network 102. In some embodiments, only one information source 116 responds at any given time, and the sequence of responses may be governed by the interrogator. For example, as mentioned above, in the EPCglobal Class 1 Generation 2 protocol, compliant tag RFID integrated circuits only respond in turn as governed by the protocol. The encoded or modulated signal is encoded or modulated with information that includes the identification code or information associated with the information source 116, and, in some embodiments, also sensor telemetry. Although terminal port circuit 110a is shown in FIG. 2 with an RF power divider/combiner or RF coupler 115a that distributes power four ways, in other embodiments the coupling factor could be two or three or it could be more than four.

Continuing to refer to FIG. 2, as discussed above, in some embodiments the information sources 116 include RFID integrated circuits, in other embodiments the information sources 116 include SAW circuits, and in still other embodiments some information sources 116 include RFID integrated circuits and others include SAW circuits. Information sources 116 may also include one or more sensors of various types (e.g., modalities).

Terminal port circuit 110a shown in FIG. 2 represents one exemplary type of terminal port circuits 110-114 of FIG. 1. FIG. 3 depicts terminal port circuit 110b, which represents an alternative exemplary type of terminal port circuits 110-114 of FIG. 1, according to at least one embodiment. As with terminal port circuit 110a, terminal port circuit 110b is considered representative of any or all of the terminal port circuits 110-114 in RFID tag 100. Terminal port circuit 110b is connected to a terminal port 103 (shown in FIG. 1) of beamforming network 102 (shown in FIG. 1) via terminal port circuit interface 104. Terminal port circuit 110b includes an RFID integrated circuit communications section 117 coupled to a data acquisition section 118, which in turn is coupled to one or more information sources 116. Each information source 116 may include an RFID integrated circuit and a sensor. According to at least one embodiment, the RFID integrated circuit communicates with the interrogator (not shown) by alternately backscattering and receiving the incident signal in order to return a modulated signal, as is well established in many forms of passive RFID tag interrogation. In some embodiments, the RFID integrated circuit communications section 117 is powered by rectifying all or a portion of the incident RF signal, and the same rectified RF power is also used to power the data acquisition section 118 and the sensors. In some embodiments, the rectified power is used to sustain only the function of the integrated circuit communications section 117, and the data acquisition 118 and sensors are powered independently by a battery or other power source. In some embodiments, terminal port circuit 110b may be implemented as a single system on a chip (SoC) and deemed an RFID IC. In some embodiments, RFID communications section 117 may constitute an RFID IC and information source 116 may contain a sensor.

Further to terminal port circuits 110a and 100b of FIGS. 2 and 3, respectively, FIG. 4 depicts terminal port circuit 110c, which represents another alternative exemplary type of terminal port circuits 110-114 of FIG. 1, according to at least one embodiment. As with terminal port circuits 110a and 110b, terminal port circuit 110c is representative of any or all of the terminal port circuits 110-114 in RFID tag 100. Terminal port circuit 110c is connected to a terminal port 103 (shown in FIG. 1) of beamforming network 102 (shown in FIG. 1) via terminal port circuit interface 104. Terminal port circuit 110c includes a waveguide circuit 115c and information sources 116 coupled to the waveguide circuit 115c. For example, waveguide circuit 115c may be a microstrip line with couple lines feeding the one or more information sources 116. Alternatively, waveguide circuit 115c might be a microstrip or stripline power divider that couples power to information sources 116. Other variants of waveguide circuit 115c are possible.

Figure 5:
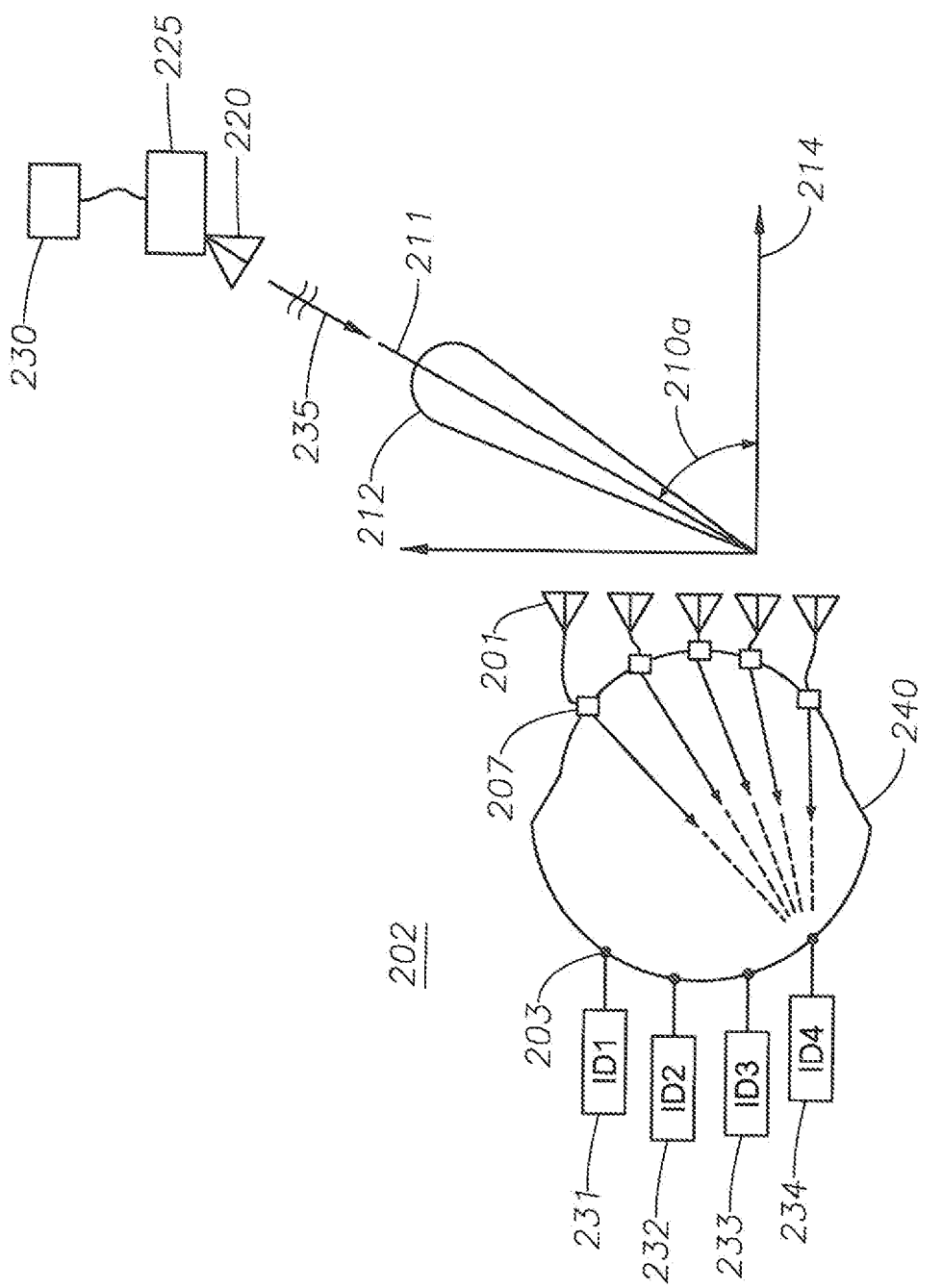
FIG. 5 is a schematic diagram, in accordance with one or more embodiments described herein, of an RFID system, showing transmission of electromagnetic radiation from an interrogator to an RFID beamforming tag.
Figure 6:
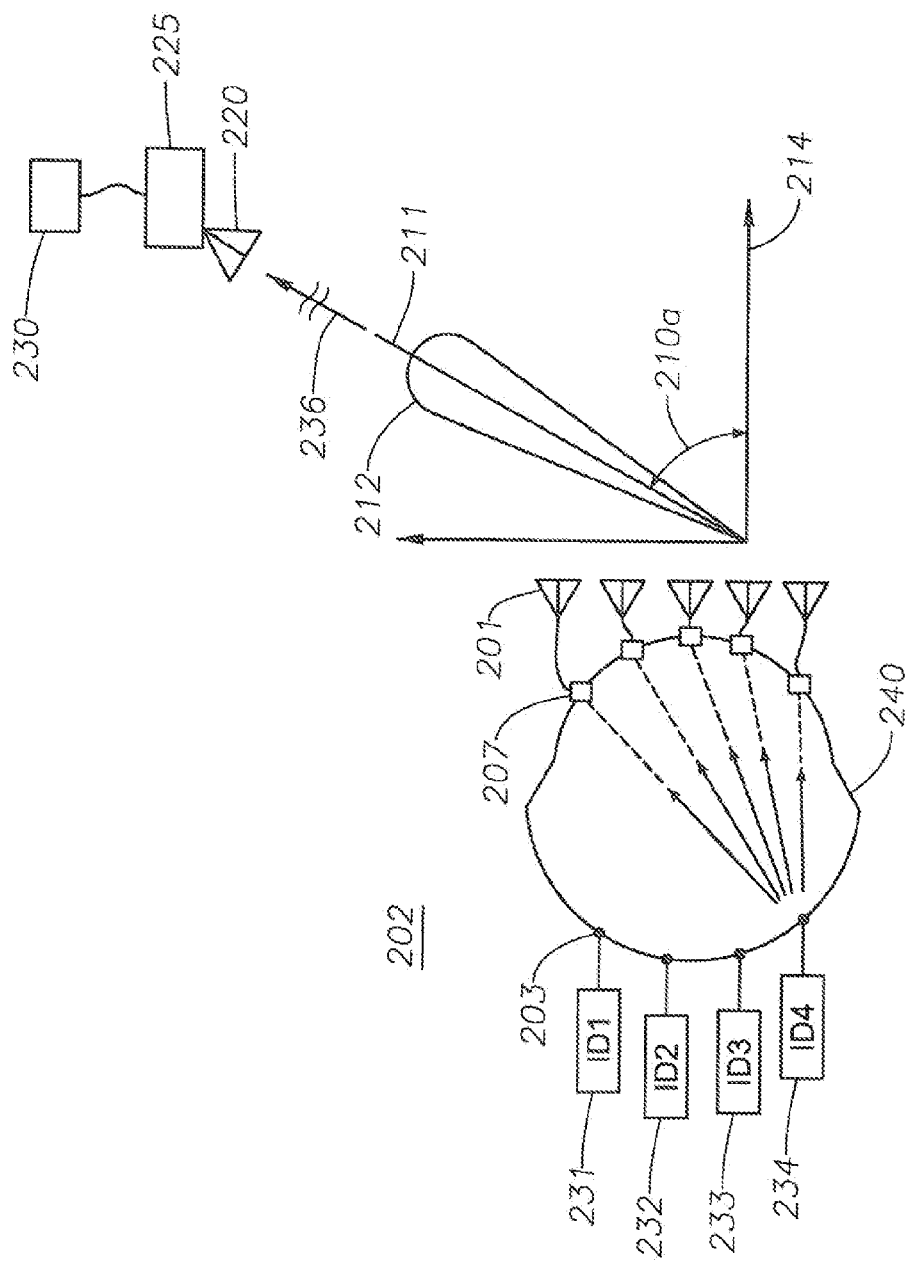
FIG. 6 is a schematic diagram, in accordance with one or more embodiments described herein, of an RFID system, showing transmission of electromagnetic radiation from an RFID beamforming tag to an interrogator.

FIGS. 5 and 6 are schematic illustrations depicting an RFID system including an interrogator and at least one RFID beamforming tag, according to some embodiments. The figures will be described in detail following a preliminary background explanation. FIG. 5 depicts an act or process of receiving or reception, in which the interrogator transmits electromagnetic radiation to the tag, the tag antennas receive the transmitted electromagnetic radiation, and the tag beamformer directs the received radiation toward one or more terminal port circuits/information sources. In this regard, the information source may be receiving instructions or commands from the interrogator, it may be writing data to memory on-board the integrated circuit, or it may be rectifying the received electromagnetic energy to power the integrated circuit of the information source. Alternatively, the on-board integrated circuit might be in a state that will reflect the received power upon arrival at the on-board integrated circuit. FIG. 6 depicts an act or process of transmission, in which a modulated or encoded form of the electromagnetic radiation received from the interrogator is transmitted back to the interrogator by the tag, as described below. In the case of a system using RFID tags having integrated circuits, the signals sent by the interrogator may be continuous wave (CW) signals for a duration of time. The typical response of an RFID tag having an integrated circuit, when such a CW signal impinges on the RFID tag, will now be described. Specifically, RFID tags with integrated circuits typically respond by modulating the CW signal transmitted by the interrogator, where the modulation is achieved by alternating periods of (1) reflecting the CW signal back to the interrogator and (2) absorbing the energy of the CW signal. Modulation of the received signal may involve modification not only of its amplitude but also of its phase. During the periods of absorption, less than 100% of the energy may be absorbed; accordingly, some of the electromagnetic radiation, ordinarily a small portion, may be reflected to the interrogator during the periods of absorption. In addition, during the periods of absorption, rectification of the absorbed energy may occur, the rectified energy being used to power and sustain the integrated circuit. In some RFID protocols, it is also possible that, during the periods of reflection, a small amount of power is absorbed to continue supporting the integrated circuit. FIG. 6 depicts an example of a period (1) during which the received signal is being reflected back toward the interrogator (in theory FIG. 6 could also represent period (2) during which the energy of the signal is absorbed, assuming the absorption is not 100%, so that a portion of the signal is reflected to the interrogator). In sum, during periods (1), namely, reflection, most or all of the power received by the tag from the interrogator is transmitted back to the interrogator, while during periods (2), namely, absorption, little or none of the power received by the tag from the interrogator is transmitted back to the interrogator. It should be noted that reception (shown in FIG. 5) may, and often does, occur simultaneously with transmission (namely, alternating periods of reflection, shown in FIG. 6, and absorption). The process of transmission/modulation varies across different RFID protocols. The sequence according to which the tag is alternately absorbing and reflecting power, and the durations of these alternating processes, determine the information with which the signal is modulated or encoded. In contrast to RFID integrated circuits, other types of RFID information sources, such as SAW circuits, respond by passively modulating or encoding the received electromagnetic signal without rectification. In SAW-based RFID, signals transmitted by the interrogator are typically not CW signals, and are often modulated RF pulses. Regardless, the beamforming RFID tag is compatible with the wide range of modulation schemes in practice with both SAW and IC-based systems. In the context of a SAW-based RFID system, FIG. 5 represents the reception of an RF pulse by the beamforming tag, and FIG. 6 represents one of a plurality of RF pulses being reflected from the SAW device in response to the received pulse. Thus, although FIGS. 5 and 6 illustrate distinct processes of receiving and transmitting electromagnetic power, those of ordinary skill in the art, now having benefit of this disclosure, will recognize that the beamforming RFID tag beamformers and antennas, as passive linear devices, support simultaneous reception and transmission of electromagnetic radiation. To be sure, the information sources may be capable of exclusive reception and exclusive transmission.

Turning now to FIG. 5 more closely, RFID interrogator 225 is coupled to a processor 230 and to an antenna 220. RFID interrogator 225 radiates an RFID signal 235, via antenna 220, in the direction of beamforming RFID tag 202. Tag 202 includes a beamforming network 240, antennas 201 coupled to antenna ports 207 of beamforming network 240, and terminal port circuits 231, 232, 233 and 234 coupled respectively to terminal ports 203 of beamforming network 240. Each of terminal port circuits 231, 232, 233 and 234 includes at least one information source. Each information source includes an RFID source, such as an RFID integrated circuit or a SAW circuit, and optionally one or more sensors. As described with respect to FIG. 1, the numbers of antennas 201, antenna ports 207, terminal ports 203, and terminal port circuits 231-234 may vary from that shown in FIGS. 5 and 6.

With continued reference to FIG. 5, RFID signal 235 is received by antennas 201 of tag 202 at an angle 210a defined relative to Cartesian coordinate system or frame of reference 214. The RFID signal received by the antennas 201 is transmitted to the beamforming network 240, and the beamforming network 240 directs the inputs from the antennas 201 so that they add at least substantially in phase at the terminal port(s) 203 that correspond(s) to the incident angle 210a. Thus, the incident RFID signal is effectively distributed to a selected one or more of the terminal ports 203, specifically the terminal port(s) 203 corresponding to incident angle 210a. At each selected terminal port 203, a corresponding one of the terminal port circuits 231-234 receives the power of the incident signal. (As discussed above with reference to FIG. 1, non-selected ones of terminal port(s) 203/terminal port circuits 231-234/information sources may receive some signal power, due to the finite directivity or focusing quality of beamforming networks and/or to unintended scattering, although FIG. 5 does not illustrate signal power being received by non-selected terminal port(s) 203/terminal port circuits 231-234/information sources.)

In the case illustrated in FIG. 5, the angle 210a is associated with a peak 211 of the characteristic beam 212 of the beamforming RFID tag. In this case, the inputs from the antennas 201 arrive predominantly in-phase at only one terminal port 203 of the beamforming network 240; as shown in FIG. 5, this terminal port 203 is associated with terminal port circuit 234 having information code ID4. Although only one characteristic beam 212 (and hence one peak 211) is shown in FIG. 5, tag 202 may have more than one characteristic beam 212, each having a peak 211.

FIG. 6 depicts the system (components) of FIG. 5 in a process of transmission. As mentioned, in the process of reception (FIG. 5), the RF power added in phase predominantly at one terminal port 203 and entered the corresponding terminal port circuit 234. In FIG. 6, terminal port circuit 234 directs a modulated or encoded form of the received RF energy back into the beamforming network 240. As discussed above, the process of encoding and/or modulating the received signal may result in a substantially reduced or insignificant amount of energy being transmitted back to the interrogator during certain finite periods of time. For information sources comprising RFID integrated circuits, during those periods of time in which a substantially reduced or insignificant amount of energy is transmitted back to the interrogator, the energy that is not transmitted back but rather absorbed may be rectified and used to power the integrated circuit. Due to reciprocity of the beamforming network 240, the antennas 201, and any interconnecting waveguides (not shown in FIG. 6), the beamforming network 240 distributes the modulated or encoded signal to the array of antennas 201 with relative time delays between the respective portions of the signal reaching successive ones of the antennas 201 such that the resulting transmitted radiation 236 is focused approximately in the direction of the interrogator 225 (that is, along angle 210a at which the power arrived) or, expressed more simply, such that the signal 236 is transmitted back approximately in the direction of the interrogator 225.

Although the beamforming RFID tag system is depicted in FIGS. 5 and 6 with only a single beam and is described as performing two distinct processes for convenience of description, typically the beamforming RFID tag 202 operates continuously with multiple beams and may perform the processes of FIGS. 5 and 6 (reception and transmission) simultaneously. In one or more embodiments, the information sources each comprise a distinct integrated circuit RFID source, such as an RFID integrated circuit or a SAW circuit, with a unique identification such that each RFID source is capable of responding to a different interrogator such as prescribed by an RFID protocol standard known as the EPCglobal Class 1 Generation 2 UHF standard. For example, an RFID integrated circuit within terminal port circuit 234 with identification ID4 is able to communicate with an interrogator 225 while simultaneously an RFID integrated circuit within terminal port circuit 231 with identification ID1 is able to communicate with a different interrogator (not shown).

In this regard, it should be noted that the orientation of beam 212 is a characteristic of the device. While in FIGS. 5 and 6, beam 212 is aligned with interrogator 225, if interrogator 225 moves the orientation of beam 212 will not change. Thus, as stated, beamforming RFID tag 202 typically operates with multiple beams, as better illustrated, e.g., in FIG. 1. Multiple beams thus permit coverage over a larger continuous angular range than would a single beam, permitting communication between tag and interrogator while interrogator is within this larger range (discussed also with reference to FIGS. 8 and 9 below).

With continued reference to FIGS. 5 and 6, the shape of the beamforming network depicted therein has the general characteristic outline of a Rotman lens with five antenna ports and four terminal ports. However, the choice of five antenna ports and four terminal ports is merely for the sake of illustration, and as noted, a different number and/or placement of antenna ports or terminal ports is possible. For example, a terminal port along the center axis of the Rotman lens, as well as two off-axis points, is often associated with minimal aberration, although such a central axis terminal port is not shown at this location in FIGS. 5 and 6. The number of antenna ports may but is not required to match the number of terminal ports. Generally speaking, the Rotman lens has M antenna elements (antennas) along a linear axis known as an outer contour (not shown in FIGS. 5 and 6) connected to a two-dimensional propagation medium, such as parallel plates, by M waveguides that are each of a specified electrical length. The M waveguides feed the two-dimensional propagation medium at antenna ports that lie on a so-called inner contour (not shown in FIGS. 5 and 6) (the M waveguides connect the antennas to the antenna ports). The opposing boundary (shown as the "left" side in FIGS. 5 and 6) of the propagation medium is a so-called focal arc, along which N input ports (terminal ports) lie. Each input port is a focal point for radiation traversing the propagation medium. There are only three optimal points on the focal arc at which the theoretical aberration is zero, but the aberration can be made acceptably low for many applications. The electrical length of the M waveguides, the x-y coordinates of each antenna port on the inner contour, and the x-y coordinates of each input port on the focal arc are selected such that the radiation arriving from an incident angle (e.g., 210a in FIG. 5) adds in phase, predominantly, in one region of the focal arc and is received by one or more input ports in that region. As shown in FIG. 5, the Rotman lens is configured as an RFID retro-reflector tag with radiation along the direction associated with ID4. As shown, this device constitutes an RFID tag device that issues four identification codes, possibly unique, associated with four different beam positions. If the beams are sufficiently spaced, then it is possible that the device returns only one beam and one associated identification. If two or more beams overlap (e.g., as in FIG. 7, described below), it is possible that multiple beams are reflected along with the multiple associated identifications. Signal strengths associated with each of the beam positions can be used to refine the bearing estimate. In the event that multiple information sources respond to the interrogator, anti-collision mechanisms that prevent interference are provided by the RFID protocol medium access control. For example, in many SAW RFID systems, anti-collision is obtained by using orthogonal codes for the SAW RFID tags. In many IC-based RFID systems, the tags respond in a so-called "aloha" protocol in which only one integrated circuit responds at any time.

Notwithstanding the general characteristics of the Rotman lens, the intent of FIGS. 5 and 6 is to illustrate a general functionality of the beamforming RFID tag that is not limited to the selection of any particular beamforming network. As stated previously, the selection of a given beamforming network bestows certain characteristics that might not be achievable with a different beamforming network. For example, the beam orthogonality readily achieved with a Butler matrix beamforming network might not be as easily achieved with some Rotman lens beamforming network implementations.

Figure 7:
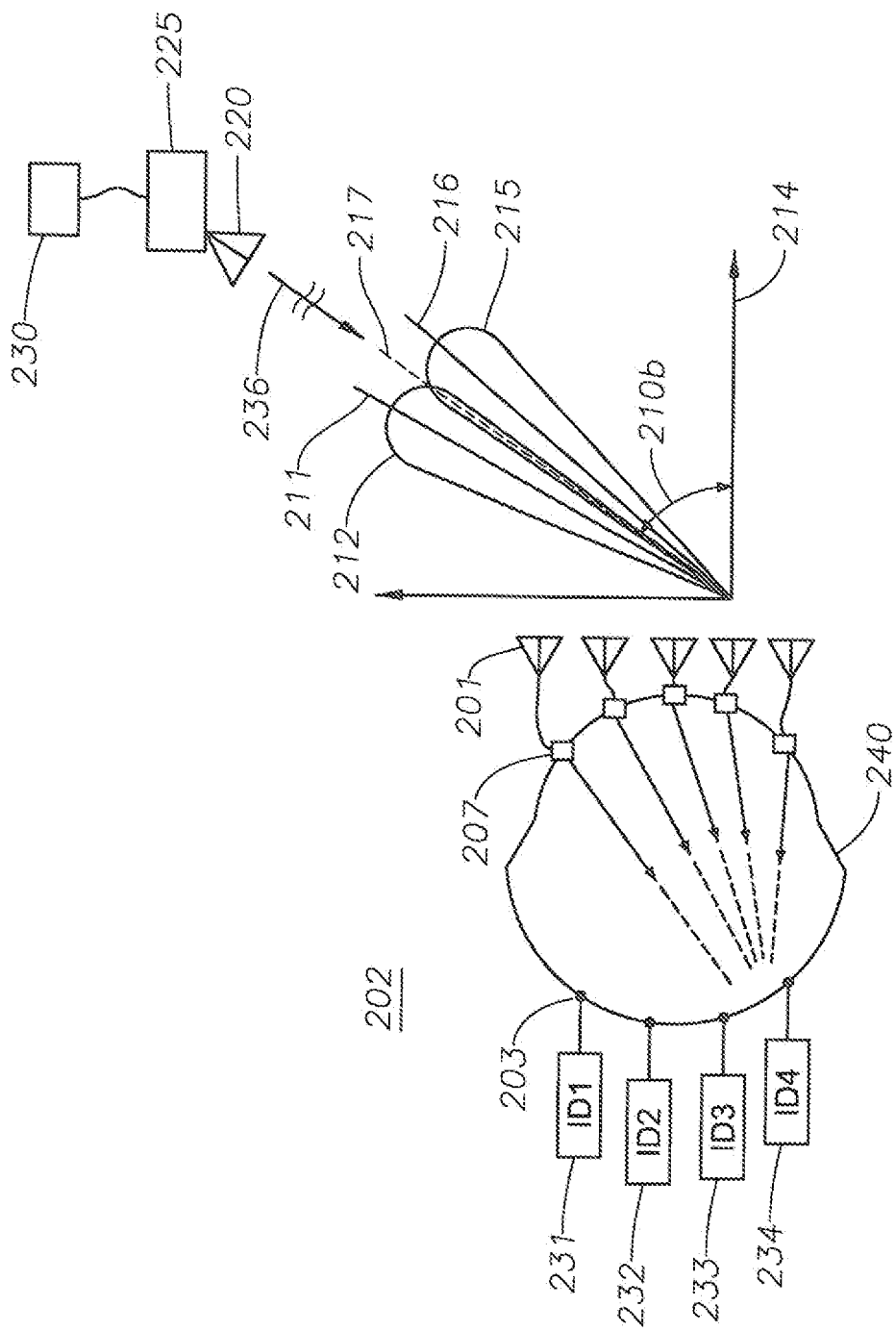
FIG. 7 is a schematic diagram, in accordance with one or more embodiments described herein, of an RFID system similar to that of FIG. 5, but wherein the electromagnetic radiation is transmitted to the RFID tag at a different angle corresponding to two terminal ports of the RFID tag as opposed to a single port as in FIG. 5.

FIG. 7 is a schematic illustration depicting the system of FIG. 5 but a different scenario, in accordance with at least one embodiment. For the sake of convenience in describing this example, FIG. 7 shows two characteristic beams 212 and 215, which overlap one another to a small degree, rather than the single beam 212 illustrated in FIG. 5. As noted above, in practice, both the systems shown in FIGS. 5 and 7 would typically operate with multiple beams, which may collectively span a larger continuous angular range. In FIG. 7, the incoming electromagnetic radiation or incident signal 236 (also denoted by dashed line 217) arrives at an angle of incidence 210*b* (defined with respect to Cartesian coordinate system 214), which falls within the edges of the two beams 212, 215, in contrast to angle of incidence 210*a* that falls at or near the peak 211 of a single beam 212 as shown in FIG. 5. At this angle of incidence 210*b*, the focal point of the beamforming network 240 is nearest to and in between the two terminal ports 203 corresponding to terminal port circuits 233 and 234 and as a result the received power from the antennas 201 adds predominantly in phase at those two terminal ports 203. The two terminal port circuits 233 and 234 are thus associated with characteristic beams 212 and 215, respectively. It will be understood that although FIG. 7 (like FIG. 5) illustrates a process of reception, a process of transmission (like FIG. 6) also occurs in the system of FIG. 7, that is, the information source in each of the two terminal ports 233, 234 transmits a modulated or encoded form of the received signal back into the beamforming network 240 such that the respective modulated or encoded signal is reradiated through the respective one of the characteristic beams 212, 215 associated with the respective terminal port. For example, if (as indicated) characteristic beam 212 is associated with terminal port circuit 233, a modulated or encoded form of the signal reaching the terminal port circuit 233 information source would be reradiated in the direction of beam 212 such that power would be returned predominantly in the direction of the interrogator 225 at an effective antenna gain level as established by the angle 210*b* relative to the peak 211 of beam 212. Similarly, where characteristic beam 215 is associated with terminal port circuit 234, a modulated or encoded form of the signal reaching the terminal port circuit 234 information source would be reradiated in the direction of beam 215 such that power would be returned predominantly in the direction of the interrogator 225 at an effective antenna gain level as established by the angle 210*b* relative to the peak 216 of beam 215. The modulated or encoded signal would be modulated or encoded with the information of the one or more RFID sources (such as RFID integrated circuits or SAW circuits) of the respective terminal port circuit (233 or 234) and, in one or more embodiments, with sensor telemetry. The signal returned to the interrogator 225 by the beamforming tag 202 is generally not in the direction of the peak of the beam unless the angle 210*b* happens to align with the angle of the beam peak. In general, it is possible that more than two beams will overlap such that an interrogator will address and communicate with more than two terminal port circuits. As described above, the process of modulating or encoding may result in a substantially negligible level of power being directed back into the beamforming network over certain delimited periods of time.

Figure 8:
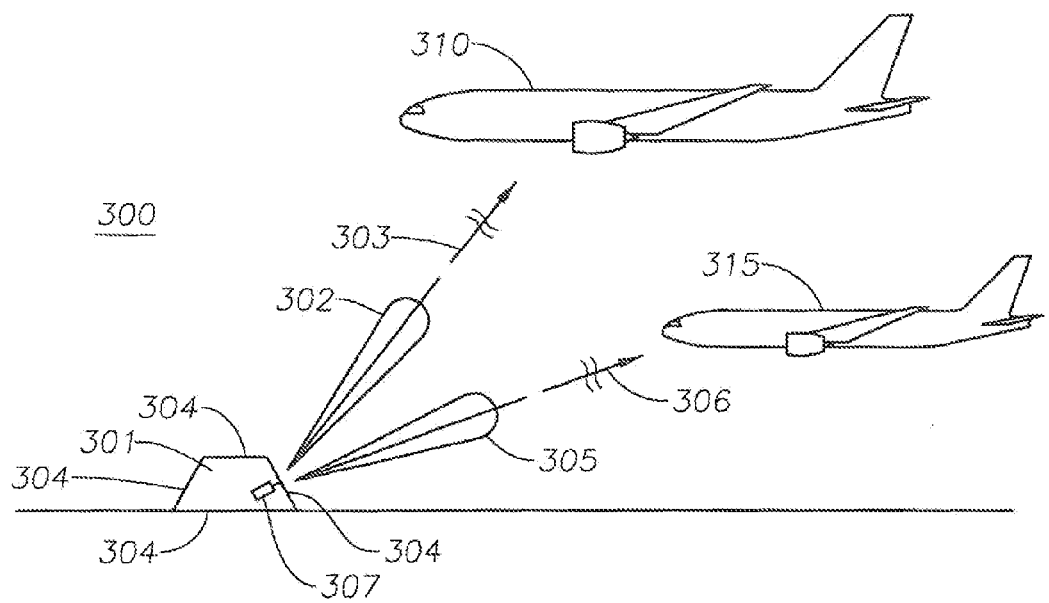
FIG. 8 is a schematic diagram, in accordance with one or more embodiments described herein, of an RFID system including multiple interrogators mounted on respective mobile platforms and a multi-faceted structure containing an RFID beamforming tag on at least one facet thereof.

FIG. 8 is a schematic illustration of an RFID system 300 including an RFID beamforming tag 307 attached to one facet 304 of a multi-faceted structure 301, and multiple interrogators (not illustrated in FIG. 8) mounted on respective mobile platforms 310, 315, in accordance with at least one embodiment. A first characteristic beam 302 of the tag 307 oriented at an upper angle provides a first identification code to a first mobile platform 310 located at an upper angle relative to the facet 304 having the tag 307, and a second characteristic beam 305 of the tag 307 oriented at a lower angle provides a second identification code to a second mobile platform 315 located at a lower angle relative to the facet 304 having the tag 307. As with FIGS. 5-7, so too in FIG. 8, to simplify description of the example, two characteristic beams are shown whereas in practice multiple beams, which may collectively span a larger continuous angular range, would typically be used. In this way, mobile platforms at any angular location relative to the tag within the range may conduct RFID communication with the tag. Also, in some embodiments, multi-faceted structure 301 may have multiple tags 307 associated respectively with multiple facets 304. This type of structure may serve, for example, to further increase the continuous angular range of coverage.

FIG. 8 shows the tag transmitting a modulated or encoded signal back to the interrogator. The reception of the electromagnetic power (sent from the interrogator) by the tag is assumed although not shown in FIG. 8. Thus, the modulated signals 303 and 306 shown in FIG. 8 are assumed to be fully modulated or encoded signals that may be characterized by having substantially little or no power over one or more time periods for certain types of amplitude modulation. Thus, as seen in FIG. 8, beamforming RFID tag 307 returns two signals 303 and 306 along two different angles associated with characteristic beams 302 and 305, respectively, in response to two interrogation signals (not shown) that were previously broadcast by interrogators (not shown) located on the two aircrafts (mobile platforms) 310 and 315, respectively, and received by the tag 307. The signal 303 with modulated identification broadcast through beam 302 is identified by a processor (not shown) coupled to the interrogator on aircraft 310 as being associated with the specific beam 302 belonging to beamforming RFID tag 307. Similarly, a processor (not shown) connected to the interrogator on aircraft 315 receives returned signal 306 with modulated identification that was broadcast through beam 305 and identifies signal 306 as being associated with beam 305. It is assumed that the position and orientation of beamforming RFID tag 307, as well as the angles associated with each of the beams comprising the characteristic beam set of beamforming RFID tag 307, all constitute information established a priori and available to each of the processors coupled to the interrogators on the aircraft 310, 315, respectively, in order that each of the processors can use the respective received modulated identification to determine the approach angle of the respective aircraft. It is also possible that the aircraft 310, 315 receive through wireless communications (not shown) the location and orientation of the constellation of one or more beamforming tags 307 (only one shown) from a database or repository (not shown). Thus, based on one or more signals returned from the constellation of one or more beamforming tags 307 and on information established and made available a priori to the software program running on the processors, or information received real-time or near-real time through wireless communication, the processor is able to determine the approach angle. When the beams within the fixed characteristic antenna radiation distribution pattern set of a beamforming RFID tag 307 overlap such that the interrogator in the aircraft receives information from more than one information source (as described with reference to FIG. 7 above), the received signal strength indication (RSSI)

associated with each information source can be used to estimate the angle of incident radiation with greater accuracy and finer resolution. Of course, the processor may also determine range (distance) and range-rate (speed) information, based on the information contained in the returned signal 306 together with the aforementioned information known a priori. In addition, it will be understood that just as information pertaining to position and orientation of the interrogator (or its platform, aircraft) relative to the tag may be determined by the processor, so too information pertaining to position and orientation of the tag (or object bearing the tag) relative to the interrogator may be determined by the processor, based likewise on the returned signal 306 and the aforementioned information known a priori, since the information pertaining to position and orientation of the tag is equivalent to (for example, obtainable by simple transformation from) the information pertaining to position and orientation of the interrogator. (The tag may be referred to as an entity that transmits a response to electromagnetic radiation it receives, e.g., from the interrogator, and the interrogator may be referred to as an entity that receives the response to the electromagnetic radiation received by the tag, the response, e.g., being transmitted by the tag.) Although FIG. 8 depicts the RFID system 300 utilizing beamforming RFID tag 307 as a navigation aid to aircraft 310, 315, the concept is directly applicable to navigation aids for other mobile platforms such as automobiles, pedestrians, bicycle riders, etc. equipped with RFID interrogators having connectivity to one or more processors.

Figure 9:
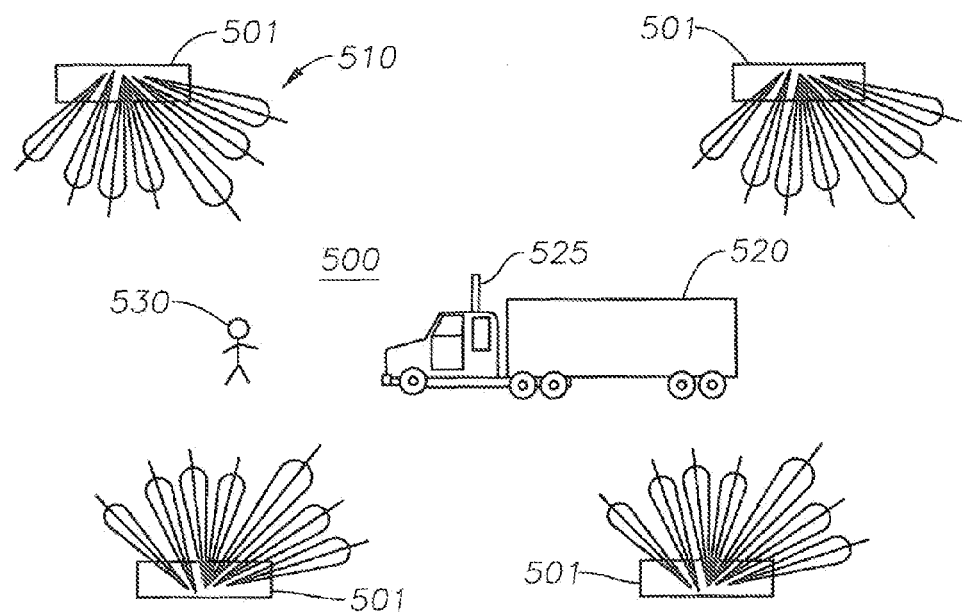
FIG. 9 is a schematic diagram, in accordance with one or more embodiments described herein, of an RFID system including interrogators mounted on mobile platforms and a constellation of multiple RFID beamforming tags.

FIG. 9 is a schematic illustration of an RFID system 500 including a constellation of (multiple) beamforming RFID tags 501 and one or more mobile platforms, in accordance with at least one embodiment. Each tag 501 has a characteristic beam set 510. Mobile platform(s) may include a vehicle 520 or person 530, as illustrated for the sake of this example, or another type of platform, as described above with reference to FIG. 8. Each mobile platform is equipped with an interrogator 525 (interrogator not shown for person 530). The constellation of tags 501 may be used to assist in navigation and/or localization of the mobile platforms. The term "localization" refers to the determination of position and/or orientation of the mobile platform. In some embodiments, the interrogators of mobile platforms 520, 530 are of a type that uses broad-beam antennas such that signals may be received from multiple (or all) beamforming RFID tags 501 of the constellation. Processors (not shown) coupled to the interrogators use the received signals together with information established a priori such as the position and orientation of each of the beamforming RFID tags 501 to determine the angle of the mobile platform relative to each of the beamforming RFID tags 501 and, using the determined angles to each of the beamforming RFID tags 501, to determine the position of the mobile platform relative to the constellation of beamforming RFID tags 501. As part of this process, as described above, the identification information encoded in the received signal is used to identify the information source and associated beam from which the signal was received.

With continued reference to FIG. 9, according to a first set of embodiments the interrogators initiate communication with the beamforming RFID tags by transmitting an RF signal to the tags, and in response the tags transmit return signals to the interrogators. In a second set of embodiments, the tags are active tags and send signals to the interrogators (which may be simply receivers) without such prior prompting by the interrogators. In the second set of embodiments, each of the beamforming RFID tags may include a power source. For example, the terminal port circuit information sources attached to the terminal ports of the beamforming RFID tags may be active radios (e.g., ultra-wideband radios) powered by batteries, the radios transmitting periodic pulses containing identification information, and the interrogators may be or include receivers that demodulate and decode the periodic pulses. In some embodiments of the second set, the radios are attached to sensors and the periodic pulses contain sensor telemetry in addition to identification information, such that the interrogator receivers decode the identification and the sensor telemetry. While the embodiments described in this disclosure with reference to figures other than FIG. 9 are for the most part described as operating according to the first set of embodiments (i.e., two-way communication: tag responds to signal transmitted by interrogator), it is in general possible to adapt such embodiments to operate according to the second set of embodiments just described (i.e., one-way communication: tag sends signal to receiver; receiver does not send signal to tag).

Embodiments operating according to the second set of embodiments (i.e., one-way communication: tag sends signal to receiver; receiver does not send signal to tag) may be further characterized as follows. As described heretofore, the signal (electromagnetic radiation) sent from tag to receiver may encode one or more identification codes, each identification code identifying one of the plurality of information sources, respectively. The one or more identification codes encoded in the signal may correspond to angular information indicating an angle at which the signal is transmitted. The transmitted signal may, due to the action of the beamforming network, be distributed to the antennas with the relative time delay of the signal to each antenna such that the combined radiation power from the antennas is concentrated within an antenna beam directed over a predetermined angular range according to the terminal port from which the transmitted signal originated. The receiver may be associated with logic configured to derive, from the transmitted signal (e.g., from the identification codes encoded therein), information pertaining to a position of the receiver and/or an orientation of the receiver. In this regard, a mapping between the identification codes of the plurality of information sources and angles at which the responses are transmitted by the RFID tag may be used. The RSSI may also be used.

Figure 10:
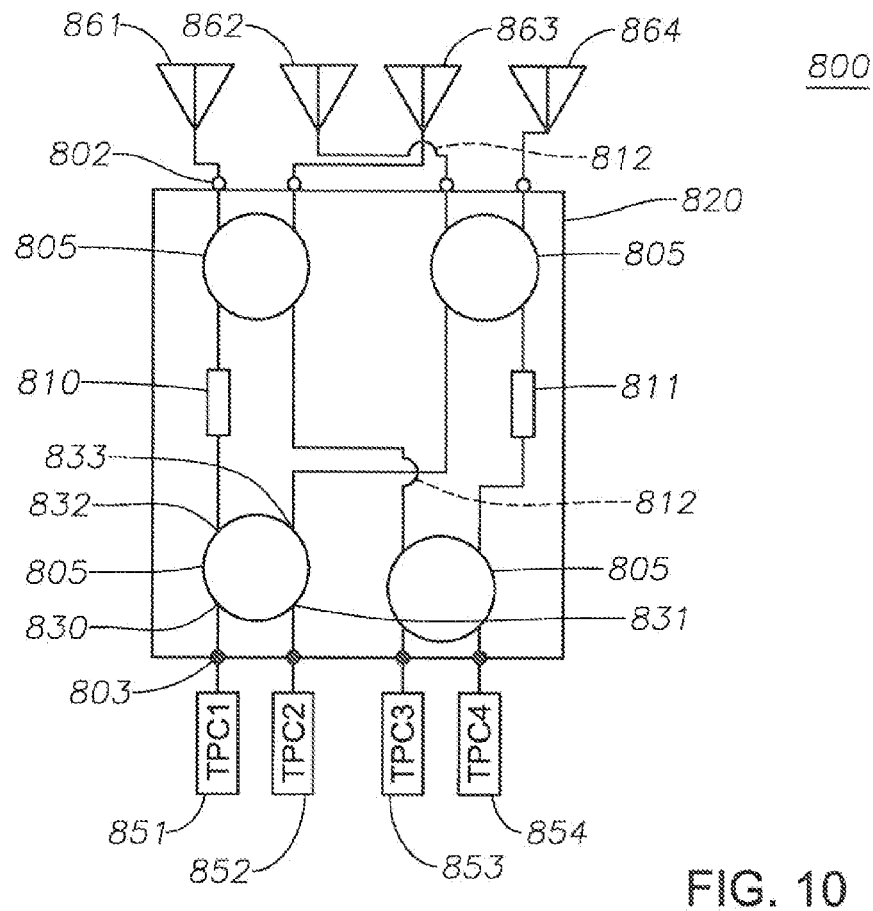
FIG. 10 is a schematic diagram, in accordance with one or more embodiments described herein, of a beamforming network that is a Butler matrix.

FIG. 10 is a schematic illustration of a beamforming RFID tag 800, wherein the beamforming network 820 is a Butler matrix, in accordance with at least one embodiment. (As mentioned above, a Butler matrix is described in *Phased Array Antennas* by A. K. Bhattacharyya (pp. 379-415).) beamforming RFID tag 800 includes a Butler matrix beamforming network 820, antennas 861, 862, 863, and 864, each attached to a corresponding antenna port 802 of the beamforming network 820, and terminal port circuits 851, 852, 853, and 854, each attached to a corresponding terminal port 803 of the beam forming network 820. Each terminal port circuit 851, 852, 853, and 854 includes at least one information source; in some embodiments, each terminal port circuit also includes one or more sensors. In some embodiments, as further illustrated in FIG. 10, the Butler matrix beamforming network 820 includes hybrid couplers 805 connected to antenna ports 802 on one side and connected to phase shifters 810 and 811 on the other side, and additional hybrid couplers 805 connected to phase shifters 810 and 811 on one side and to terminal ports 803 on the other side. The former hybrid couplers 805 (the pair closest to the antennas ports 802) serve the function of power division for incoming signals (signals received by the tag) and power combining for outgoing signals (signals being transmitted from the tag), while the latter hybrid couplers 805 (the pair closest to the terminal ports 803) serve the function of power combining for incoming signals and power division for outgoing signals. The phase shifters 810 and 811 serve the function of path length adjustment for beam steering. All of the hybrid couplers 805 perform phase shifting functions in addition to power combining and dividing, as is well known by those of ordinary skill in the art now having benefit of this disclosure. The above-mentioned components of tag 800 are interconnected, in the manner illustrated in FIG. 10, by RF transmission lines or waveguides, which may include microstrip line, stripline, synthetic integrated waveguide, or any of numerous other equivalent waveguiding technologies. Additional meandering of some interconnecting lines, not shown in FIG. 10, may achieve the overall required differences in electrical line lengths. Crossovers 812 indicate transmission or waveguide lines that permit cross-over of electrical signals. In an embodiment, this crossover is implemented by wires or vias that cross without established electrical contact. In another embodiment, the cross-over is implemented by a microstrip or stripline planar 4-port cross-over design in which all lines lie within the same plane such that they can be fabricated on a single printed circuit board layer in conjunction with a lower conductive ground plane and an intervening non-conductive substrate layer. See "Microstrip Antenna Array with Four Port Butler Matrix for Switched Beam Base Station Application" by M. M. Alam (Proceedings of 2009 12$^{th}$ International Conference on Computer and Information Technology (ICCIT 2009), 21-23 Dec. 2009, Dhaka. Bangladesh, pp. 531-536). The numbers of antennas, antenna ports, terminal port circuits, terminal ports, hybrid couplers, and phase shifters may vary from what is illustrated in FIG. 10.

With continued reference to FIG. 10, in some embodiments the hybrid couplers 805 are branchline hybrid couplers, with the following characteristics. With reference to the hybrid coupler 805 shown at lower left in FIG. 10, such a branchline hybrid coupler 805 has a first input port 830, a second input port 831, a first output port 832, and a second output port 833. The first input port 830 couples power equally to the first and second output ports 832 and 833 and the phase of a continuous wave signal at the second output port 833 lags the phase of that at the first output port 832 by 90 degrees. Further, the second input port 831 is theoretically isolated from the first input port 830 such that no power theoretically reaches the second input port 831 from the first input port 830 except that portion which reflects from the first output port 832 or the second output port 833 and returns to the second input port 831. Assuming the other three hybrid couplers 805 shown in FIG. 10 are similarly constructed with (as illustrated) the lower left side port representing the first input port, the lower right side port representing the second input port, the upper left side port representing the first output port, and the upper right side port representing the second output port, and further assuming that phase shifters 810 and 811 each represent a 45 degree phase delay at the center frequency of operation, then the signal phase progression at the center frequency of operation and normalized to 0 degrees at antenna 861, for an input source at the place of terminal port circuit 851, would be 0 degrees at antenna 861, −45 degrees at antenna 862, −90 degrees at antenna 863, and −135 degrees at antenna 864. Such a phase progression would produce a steered beam, the angle of the steered beam being dependent upon the frequency of operation and the spacing between antennas 861-864. Considering the same example with the source at the place of terminal port circuit 852 instead of 851, the phase progression across the antennas 861-864 from left (antenna 861) to right (antenna 864) would be in increments of +135 degrees. For the source located instead at the place of terminal port circuit 853, the phase progression would be in increments of −135 degrees, and for the source located instead at the place of terminal port circuit 854, the phase progression would be in increments of +45 degrees. The angle theta to which the beam is steered is given by $\sin(\theta)=\psi/(kd)$, where d is the linear separation space between the apparent or effective phase centers of adjacent antennas, psi is the phase progression, $k=\omega/c$, omega is the radian frequency, and c is the speed of light. It should be noted that this embodiment is just one example of a Butler matrix implementation, and many other implementations of the Butler matrix or of derivatives of the Butler matrix are possible and could be used in the design and development of a beamforming RFID tag.

Figure 11:
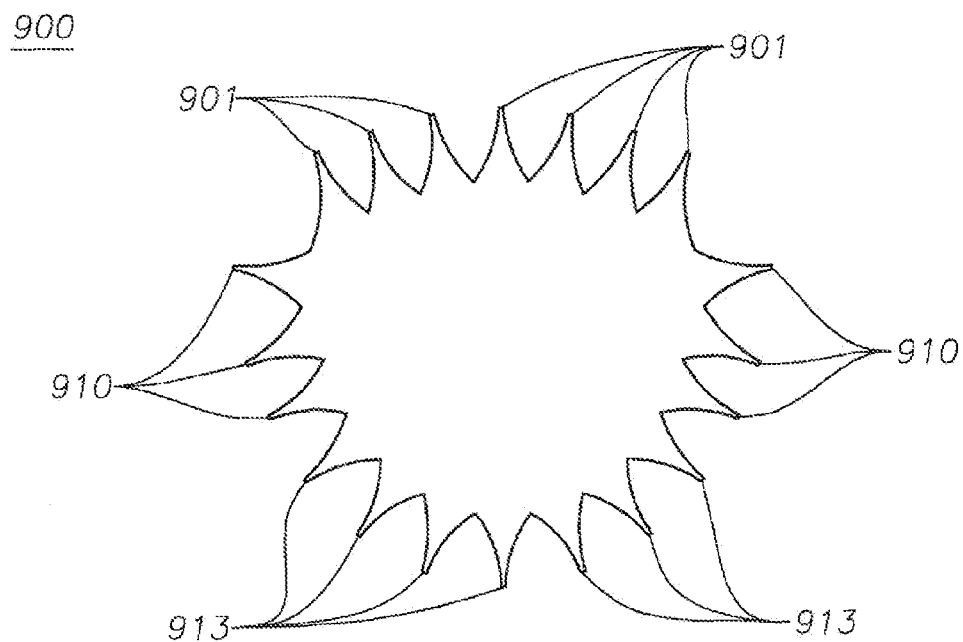
FIG. 11 is a schematic diagram, in accordance with one or more embodiments described herein, of a beamforming network that is a Rotman lens.

FIG. 11 is a schematic illustration of a Rotman lens beamforming network 900 for a microstrip type implementation, in accordance with at least one embodiment described herein. The Rotman lens beamforming network 900 includes a plurality of antenna ports 901, a plurality of terminal ports 913, and a plurality of dummy ports 910. Dummy ports 910 are often placed along regions of the focal arc that lie outside of the design region in which focusing can be obtained, yet still may receive radiation outside of the design intent, often due to the broad distribution of electromagnetic power from an antenna port or a terminal port. In typical applications of Rotman lenses, loaded dummy ports are often placed along these extensions of the focal arc in order that the impinging scattered radiation not reflect and subsequently degrade the signal radiating toward either the antennas or the terminal ports. The numbers of antenna ports 901, terminal ports 913, and dummy ports 910 may differ from what is illustrated in FIG. 11. Typically, such a microstrip type Rotman lens would include a layer of conductive material that resides on top of an insulating region, and the opposing side of the insulating region would include a ground plane. The outline of the shape shown in FIG. 11 represents the outer boundary of the layer of conductive material. Signals received by antennas (not shown) connected to antenna ports 901 propagate through a parallel plate region formed by the layer of conductive material and the ground plane beneath it, and add in phase at a region around a subset of the terminal ports 913, the configuration of this region depending on the specific design of the Rotman lens contours and the angle of arrival of the incident signals. In some embodiments, terminal port circuits (not shown) attached to the terminal ports 913 of the Rotman beamforming network 900 receive the focused energy and the terminal port circuit information sources direct a modulated or encoded form of the received signal back into the Rotman beamforming network 900 such that the resulting signal is sent back in the direction of the interrogator (not shown) to the extent that the angle to the interrogator relative to the beamformer antenna array is within one or more of the characteristic beams of the beamforming RFID tag. In other embodiments, each terminal port circuit is or includes a radio that periodically broadcasts a signal including an identification code or information unique to that terminal port circuit, and the signal is received by an interrogator that may be simply a receiver; no initiating signal from interrogator to tag is required. In some of these embodiments, the radios are ultra-wideband (UWB) radios. In some embodiments, telemetry from one or more sensors (in the terminal port circuits) is also transmitted by each terminal port circuit.

Figure 12:
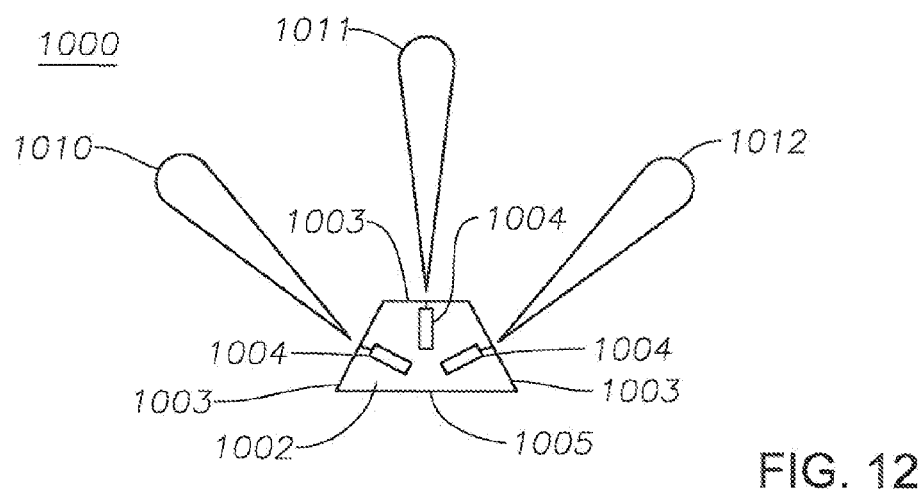
FIG. 12 is a schematic diagram, in accordance with one or more embodiments described herein, of a multi-faceted beamforming RFID tag, with a respective single-beam RFID facet-tag attached to each of three facets of the multi-faceted structure, each of the single-beam RFID facet-tags including a single antenna and terminal port.

FIG. 12 is a schematic illustration of a multi-faceted beamforming RFID tag 1000, in accordance with at least one embodiment. Multi-faceted beamforming RFID tag 1000 includes a multi-faceted structure 1002 including three utilized faces 1003 and one unutilized face 1005. Each utilized face 1003 includes an antenna, antenna port, terminal port (the antenna, antenna port, and terminal port are not specifically shown in FIG. 12 but have been described and illustrated generally in other figures herein, such as the antenna 101, the antenna port 107, and the terminal port 103 of FIG. 1), and terminal port circuit 1004, each terminal port circuit 1004 including an information source which may be an RFID source, such as an RFID integrated circuit or a SAW circuit. These components are interconnected, as has been described with reference to other illustrated embodiments herein. The unutilized face 1005 is not utilized for RFID. Each antenna may have a single fixed beam, such that the tag 1000 has a characteristic set of beams 1010, 1011, and 1012 that cover a region of space through which the beamforming RFID tag 1000 is capable of communicating with one or more interrogators (not shown) in different directions. While tag 1000 does not have a beamforming network per se, the functional equivalent of beamforming is implemented by the arrangement of the single beam antennas on the multi-faceted structure. In some embodiments, the terminal port circuits 1004 include sensors in addition to the RFID sources. In some embodiments, the beams 1010, 1011, and 1012 of the characteristic antenna radiation distribution pattern set overlap to some extent so as to provide for communication over a continuous angular range, as described above with respect to other illustrated embodiments. In some embodiments, each of the beams 1010, 1011, and 1012 receives incident radiation that is then coupled to the corresponding information source, which encodes the received signal with identification information and, if applicable, sensor telemetry information prior to retransmitting the signal back through the corresponding antenna. In other embodiments, each terminal port circuit 1004 is or includes a radio that periodically transmits an RF signal modulated with identification information and, in applicable embodiments, sensor telemetry information, to be received by an interrogator or in other embodiments by a receiver; in these embodiments of one-way communication, transmission of an incident signal from an interrogator to the tag 1000 is not required. In some of these embodiments, the radios are ultra-wideband radios. The number of facets, the number of utilized facets 1003 and unutilized facets 1005, and the numbers of the components associated with each utilized facet 1003 may differ from what is illustrated in FIG. 12. The number, spacing, and direction of beams 1010, 1011 and 1012 may also differ from what is illustrated in FIG. 12.

Figure 13:
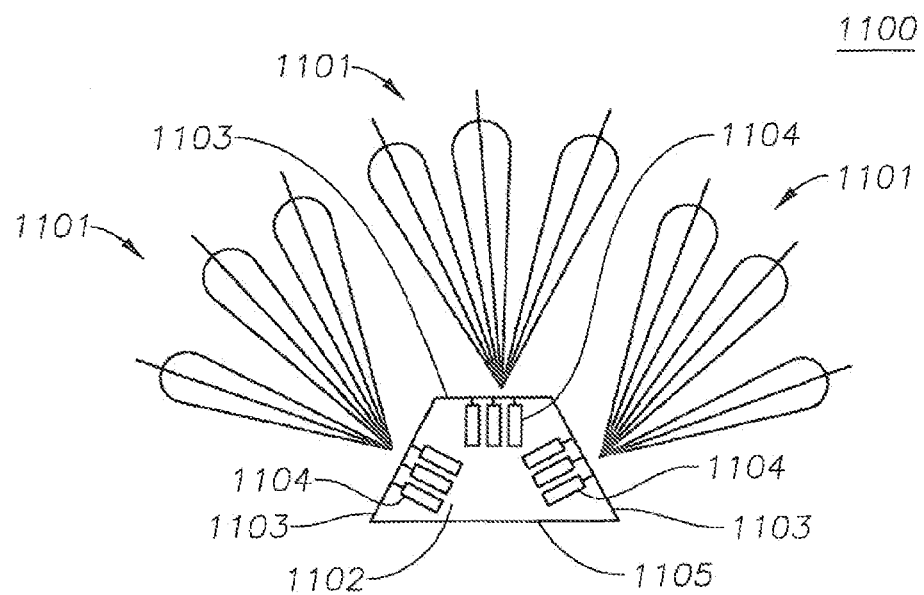
FIG. 13 is a schematic diagram, in accordance with one or more embodiments described herein, of a multi-faceted beamforming RFID tag, with a respective beamforming RFID facet-tag attached to each of three faces of the multi-faceted structure, each of the beamforming RFID facet-tags including multiple antennas and multiple terminal ports.

FIG. 13 is a schematic illustration of a multi-faceted beamforming RFID tag 1100, in accordance with at least one embodiment. Multi-faceted beamforming RFID tag 1100 includes a multi-faceted structure 1102 including three utilized faces 1103 and one unutilized face 1105. The unutilized face 1105 is not utilized for RFID. Each utilized face 1103 has a (single-facet) beamforming RFID tag (not shown as such) that includes a beamforming network (not shown), antennas (not shown) each connected to a respective antenna port (not shown), and three terminal port circuits 1104 each connected to a terminal port (not shown), each terminal port circuit 1104 including an information source which may be an RFID source (such as an RFID integrated circuit or a SAW circuit), and, optionally, one or more sensors. (While each utilized face 1103 is shown as having a characteristic beam set 1101 of three beams, the number of antennas need not be the same as the number of beams.) These components are interconnected, as has been described with reference to other illustrated embodiments herein. Each single-facet beamforming RFID tag has a characteristic beam set 1101 that provides coverage over a defined angular region, and each of the beams of the characteristic beam set 1101 is associated with one or more terminal ports of the beamforming network. The combined coverage provided by the three single-facet beamforming RFID tags is greater than the coverage provided by any single one of the single-facet beamforming RFID tags. Beamforming networks and attached antennas on planar structures are limited with respect to the angular communication coverage provided. The multi-faceted beamforming RFID tag 1100 overcomes or mitigates this limitation because it includes multiple beamforming RFID tags disposed on different facets (planar surfaces), respectively, of multi-faceted beamforming RFID tag 1100, which collectively provide characteristic beams over a larger angular region than does any single one of the single-facet beamforming tags. A multi-faceted beamforming RFID tag may also provide increased coverage compared to an enlarged size single facet (planar array) tag due to the fact that achievable gain is at a maximum broadside to the planar array and falls off as the position of the signal moves toward the edges of the array. In some embodiments, the terminal port circuits 1104 of the single-facet beamforming RFID tags are or include RFID integrated-circuits that respond to an interrogator (not shown) by backscattering a signal transmitted by the interrogator. In some embodiments, the terminal port circuits 1104 of the single-facet beamforming RFID tags are or include SAW RFID circuits.

As with the tag 1000 of FIG. 12, the tag 1100 of FIG. 13 may be characterized by the following features. The beams of the characteristic antenna radiation distribution pattern sets 1101 may overlap to some extent so as to provide for communication over a continuous angular range, as described above with respect to other illustrated embodiments. The tag 1100 may receive incident radiation from an interrogator and transmit a modulated form of the received signal back to the interrogator, the modulated signal including identification information and, if applicable, sensor telemetry information. Alternatively, the tag 1100 may include in terminal port circuit 1104 a radio (e.g., ultra-wideband radio) that periodically transmits a modulated RF signal to an interrogator (receiver), without prompting by an incident signal from the interrogator. The number of facets, the number of utilized facets 1103 and unutilized facets 1105, and the numbers of the components and beams associated with each utilized facet 1103 may differ from what is illustrated in FIG. 13. The number, spacing, and direction of beams 1101 may also differ from what is illustrated in FIG. 13.

In the case of multi-faceted beamforming RFID tag 1100, described above with reference to FIG. 13, the beamforming network may be, among other things, a microwave lens, a Rotman lens, a Butler matrix, a Blass matrix, or formed of power dividers and combiners, all of which have been described above. Again, multi-faceted beamforming RFID tag 1100 may include a power combining network for each face to which antennas are attached. The terminal port circuits may be attached to the terminal ports of the power combining network. The power combining circuit of each face may couple the one or more antennas on the face so that signals received by the antennas from an RFID interrogator add at a single terminal port of the face and, reciprocally, signals transmitted at the single terminal port of the face are distributed to the face's antennas connected to the power combining circuit for radiating back to an RFID interrogator, wherein the multiple faces to which antennas are attached are oriented with respect to each other to provide antenna coverage over the desired angular region. Each of the one or more faces may provide coverage over a fixed predefined angular region. As compared to conventional omnidirectional tags, the faces of multi-faceted tags may provide increased directivity, whereby interrogation range (linear extent of RFID communication) may be increased. Resolution and accuracy of angular measurement of interrogator (mobile platform) may be increased by narrowing the beamwidth of the constituent faces (increased aperture size) and consequently increasing the number of faces utilized. In addition to the various types of beamforming networks described above, van Atta retro-reflectors (described below with reference to FIG. 16) may be used in multi-faceted beamforming RFID tags. In sum, multi-faceted beamforming RFID tags may provide increased spatial coverage (angular extent of coverage), directivity, range (linear extent or maximum distance within which communication can be conducted), and resolution.

Figure 14:
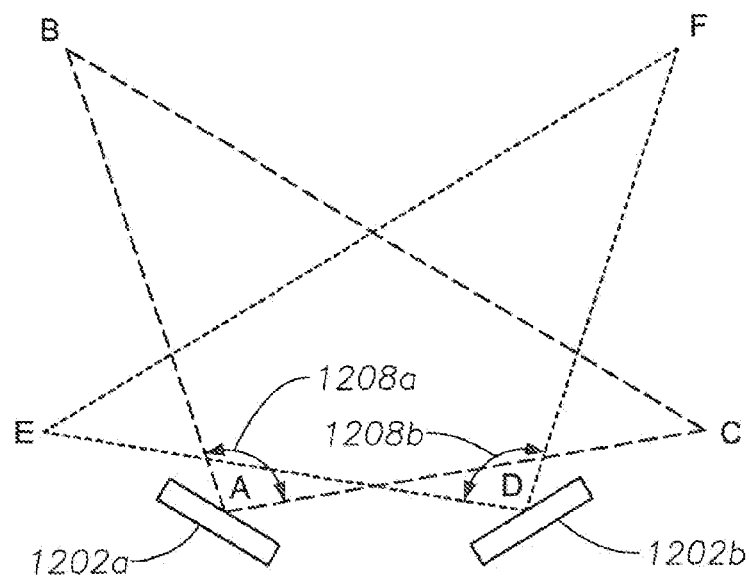
FIG. 14 is a schematic diagram, in accordance with one or more embodiments described herein, illustrating an exemplary spatial range of coverage of beamforming RFID tags.

FIG. 14 is a schematic diagram illustrating an exemplary spatial range of coverage of two single facet beamforming RFID tags, in accordance with at least one embodiment. Each of two beamforming RFID tags 1202a and 1202b has a characteristic set of antenna radiation distribution patterns (beams) that provides coverage over a defined angular region, as described above. As shown in the figure, that angular region, or angular range of coverage, of beamforming tags 1202a and 1202b, is represented by angles 1208a (CAB) and 1208b (FDE), respectively, which subtend sides BC and EF of triangles ABC and DEF, respectively, which are the longest sides of those triangles. Triangles ABC and DEF may be said to represent the partitioning of space by the two tags 1202a and 1202b. In other embodiments, the range of coverage, and the magnitudes of angles 1208a and 1208b, may vary from what is illustrated in FIG. 14, e.g., due to change of the characteristic beam set or change in other aspect(s) of the arrangement. Of course, other arrangements having different numbers of tags may also be provided.

Figure 15:
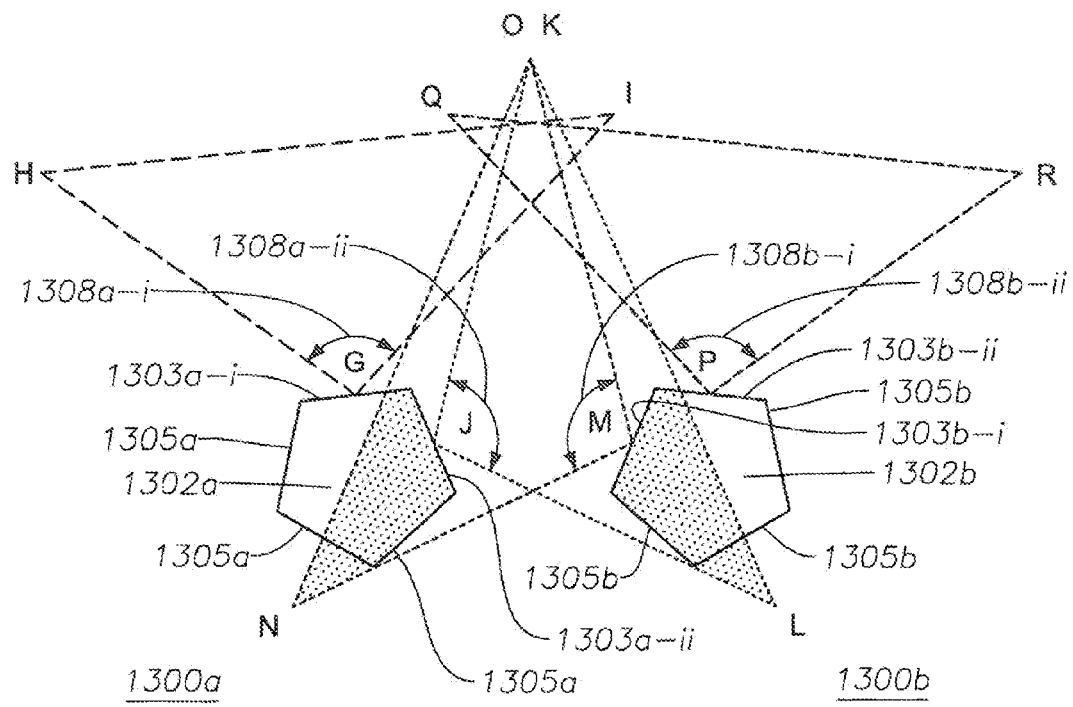
FIG. 15 is a schematic diagram, in accordance with one or more embodiments described herein, illustrating an exemplary spatial range of coverage of a multi-faceted beamforming RFID tag.

FIG. 15 is a schematic diagram illustrating an exemplary spatial range of coverage of two multi-faceted beamforming RFID tags, in accordance with at least one embodiment. Each of two multi-faceted beamforming RFID tags 1300a and 1300b includes a multi-faceted structure 1302a and 1302b, respectively. Multi-faceted structure 1302a has two utilized faces 1303a-i and 1303a-ii and three unutilized faces 1305a, and multi-faceted structure 1302b has two utilized faces 1303b-i and 1303b-ii and three unutilized faces 1305b. Each of the utilized faces 1303a-i, 1303a-ii, 1303b-i, and 1303b-ii has a beamforming RFID tag (not shown as such). Each beamforming RFID tag has a characteristic set of antenna radiation distribution patterns (beams) that provides coverage over a defined angular region, as described above. As shown in the figure, that angular region, or angular range of coverage, of the beamforming tags on utilized faces 1303a-i, 1303a-ii, 1303b-i, and 1303b-ii, is represented by angles 1308a-i (IGH), 1308a-ii (UK), 1308b-i (NMO), and 1308b-ii (QPR), respectively, which subtend sides HI, KL, NO, and QR of triangles GHI, JKL, MNO and PQR, respectively, which are the longest sides of those triangles. Triangles GHI, JKL, MNO and PQR may be said to represent the partitioning of space by the four tags of the four utilized faces 1303a-i, 1303a-ii, 1303b-i, and 1303b-ii, respectively. To be sure, the dotted portions of triangles JKL and MNO do not represent portions of the range of coverage of tags 1300a and 1300b, respectively, as each of these regions is blocked by the other tag (1300b and 1300a, respectively). In other embodiments, the range of coverage, and the magnitudes of angles 1308a-i, 1308a-ii, 1308b-i, and 1308b-ii, may vary from what is illustrated in FIG. 15, e.g., due to change of the characteristic beam set or change in other aspect(s) of the arrangement. Of course, other arrangements having different numbers of tags or utilized faces may also be provided.

Figure 16:
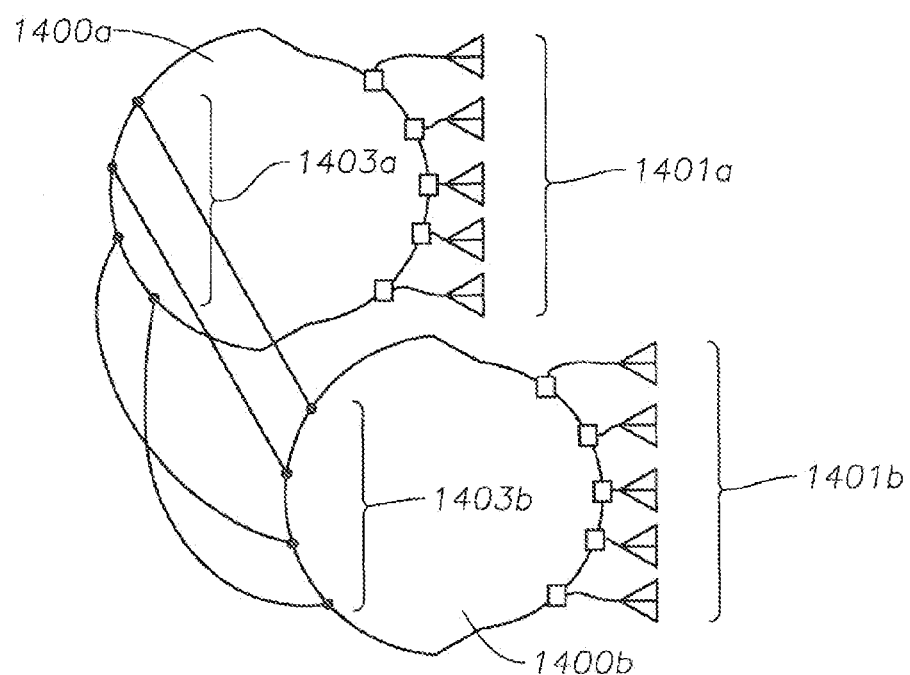
FIG. 16 is a schematic diagram, in accordance with one or more embodiments described herein, illustrating a hybrid Rotman lens/van Atta retro-reflector.

FIG. 16 is a schematic diagram illustrating a hybrid Rotman lens/van Atta retro-reflector, in accordance with at least one embodiment. The hybrid Rotman lens/van Atta retro-reflector is a hybrid combination of a Rotman lens, as described above, and a van Atta retro-reflector, as described in U.S. Pat. No. 8,466,776, issued on Jun. 18, 2013, which is hereby incorporated herein in its entirety. The hybrid Rotman lens/van Atta retro-reflector is formed by connecting corresponding input ports (terminal ports) on pairs of Rotman lenses as van Atta pairs. As seen in FIG. 16, two Rotman lenses 1400a and 1400b are provided, each one connected to a set of antennas 1401a and 1401b, respectively, and to a set of input ports 1403a and 1403b, respectively. Input ports 1403a are connected to corresponding ones of input ports 1403b, respectively. RFID functionality can be incorporated in this arrangement as described in aforementioned U.S. Pat. No. 8,466,776. This arrangement can be scaled by adding additional van Atta pairs of Rotman lenses. The hybrid Rotman lens/van Atta retro-reflector provides full steering over two orthogonal angles.

Figure 17:
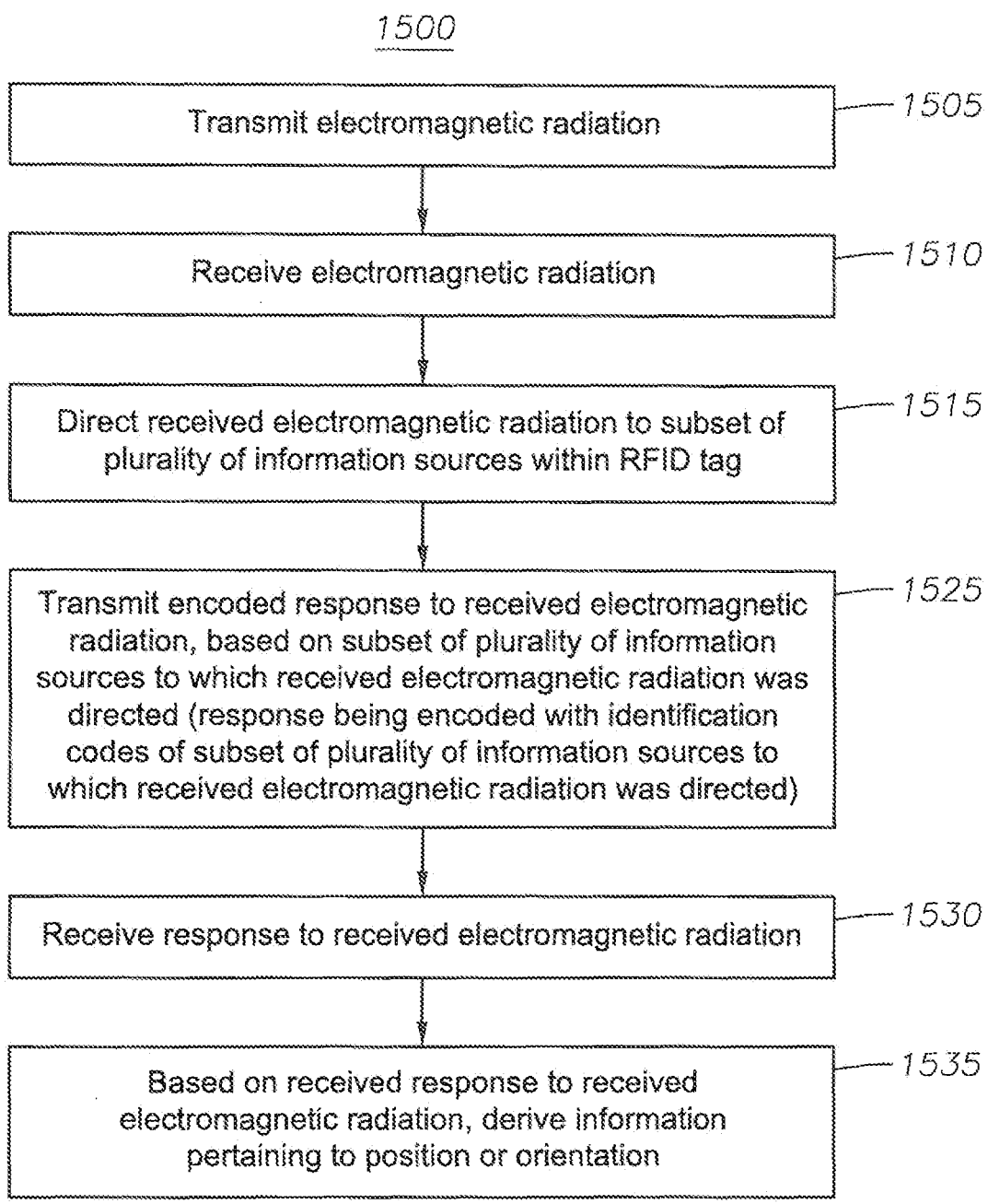
FIG. 17 is a flow chart, in accordance with one or more embodiments described herein, of a method of RFID using one or more beamforming RFID tags.

FIG. 417 is a flow chart illustrating a method of RFID 1500 using one or more beamforming RFID tags. Each beamforming RFID tag includes a plurality of information sources and a beamforming network. At step 1505, electromagnetic radiation (e.g., an RFID signal) is transmitted. This signal may be transmitted by an interrogator and may be intended to be received by an RFID beamforming tag. At step 1510, the transmitted signal is received, e.g., by the tag via antennas of the tag. The signal may be received at an angle of incidence relative to a fixed coordinate system and through one or more characteristic beams of the set of characteristic beams implemented by the beamforming network in conjunction with the antennas. At step 1515, the received signal is directed, e.g., by the beamforming network of the tag, to a subset of the plurality of information sources within the tag. Such subset may but need not include all of the information sources of the tag. The subset of the plurality of information sources to which the received signal is directed may be determined based on the angle of incidence. At step 1525, an encoded response (signal) to the received signal is transmitted. The response is encoded with (a) identification codes of the subset of the plurality of information sources to which the received signal was directed and, optionally, (b) sensor telemetry. The response may thus be based on the subset of the plurality of information sources to which the received signal was directed. The response may be transmitted to the interrogator. The response may be transmitted (a) at the angle of incidence (the angle at which the signal was received) and (b) in a direction opposite to the direction from which the signal was received. The response may be transmitted through the one or more characteristic beams through which the received signal was received in step 1510. The received signal may be used as a source of power for transmitting the response. At step 1530, the response is received, e.g. by the interrogator. At step 1535, information pertaining to a position or an orientation of an entity that received the response (e.g., the interrogator), relative to an entity that transmitted the response (e.g., the tag), or information pertaining to a position or an orientation of an entity that transmitted the response (e.g., the tag), relative to an entity that received the response (e.g., the interrogator), is derived, based on the received response, a mapping between the identification codes and the angles of signal transmission, and the RSSI. Such position (or ranging) information may include, e.g., a(n estimated) distance from the interrogator (or mobile platform housing the interrogator) to the tag (or object bearing the tag), or a(n estimated) location of the interrogator/platform or tag/object. The distance may be determined (estimated) based on the elapsed time between the transmission of the signal by the interrogator and the reception of the response signal from the tag. Such position information may be used for navigation, localization and/or tracking of the mobile platform housing the interrogator or of the object bearing the tag. Such orientation (or angular) information may include, e.g., a(n estimated) bearing (angle) of the interrogator (or mobile platform housing the interrogator) relative to the tag (or object bearing the tag), or of the tag relative to the interrogator. Such orientation information may be used for navigation, localization and/or tracking of the mobile platform housing the interrogator or of the object bearing the tag. Following step 1535, one or more additional responses to one or more additional received signals, respectively, may be received, e.g., by the interrogator, and the initial response may be compared to the one or more additional responses. Such comparison may facilitate or improve navigation, localization and/or tracking of the mobile platform housing the interrogator or of the object bearing the tag. It will be noted that, while an initial instance of step 1525 (transmission of response) must be preceded by an instance of step 1510 (reception of incoming electromagnetic radiation) and an instance of step 1515 (directing of received incoming electromagnetic radiation to information source(s)), otherwise the steps of method 1500 and the other steps mentioned in this paragraph may occur in temporal sequence(s) other than that illustrated in FIG. 17 and described in this paragraph. For example, step 1510 and/or step 1515 may occur concurrently with step 1525.

Figure 18:
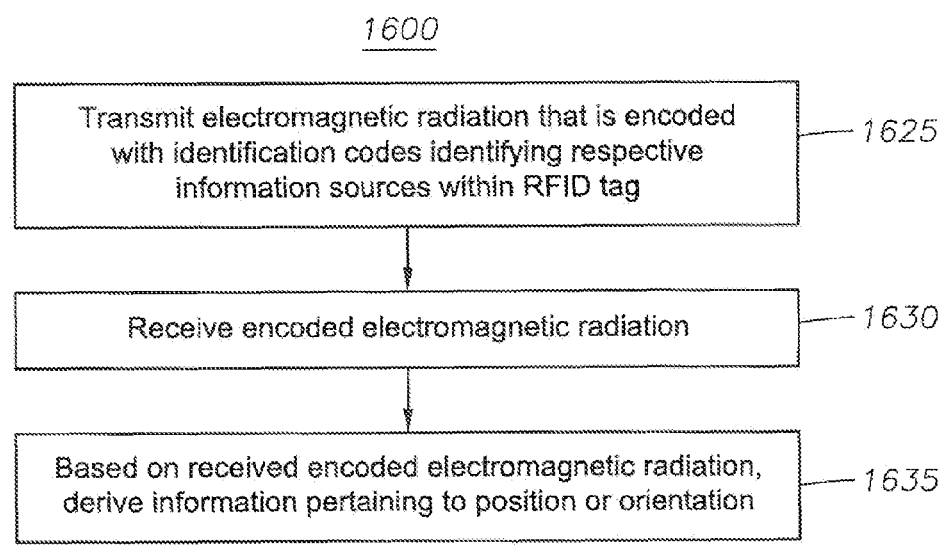
FIG. 18 is a flow chart, in accordance with one or more embodiments described herein, of a method of RFID using one or more beamforming RFID tags.

FIG. 18 is a flow chart illustrating a method of RFID 1600 using one or more beamforming RFID tags. Each beamforming RFID tag includes a plurality of information sources and a beamforming network. At step 1625, encoded electromagnetic radiation (e.g., an encoded RF signal) is transmitted. The signal is encoded with (a) one or more identification codes, each of the identification codes identifying a respective one of the plurality of information sources of the tag and, optionally, (b) sensor telemetry. The one or more identification codes with which the signal is encoded may correspond to angular information indicating an angle at which the signal is transmitted. The signal may be transmitted to a receiver. At step 1630, the signal is received, e.g. by the receiver. At step 1635, information pertaining to a position or an orientation of an entity that received the signal (e.g., the receiver), relative to an entity that transmitted the signal (e.g., the tag), or information pertaining to a position or an orientation of an entity that transmitted the signal (e.g., the tag), relative to an entity that received the signal (e.g., the receiver), is derived (e.g., by logic associated with the receiver), based on the transmitted signal, a mapping between the identification codes and the angles of signal transmission, and the RSSI. Such position (or ranging) information may include, e.g., a(n estimated) distance from the receiver (or mobile platform housing the receiver) to the tag (or object bearing the tag), or a(n estimated) location of the receiver/platform or tag/object. The distance may be determined (estimated) based on the elapsed time between the transmission of the signal by the tag and the reception of the signal by the receiver. Such position information may be used for navigation, localization and/or tracking of the mobile platform housing the receiver or of the object bearing the tag. Such orientation (or angular) information may include, e.g., a(n estimated) bearing (angle) of the receiver (or mobile platform housing the receiver) relative to the tag (or object bearing the tag), or of the tag relative to the receiver. Such orientation information may be used for navigation, localization and/or tracking of the mobile platform housing the receiver or of the object bearing the tag. Following step 1635, one or more additional signals may be received, e.g., by the receiver, and the initial signal may be compared to the one or more additional signals. Such comparison may facilitate or improve navigation, localization and/or tracking of the mobile platform housing the receiver or of the object bearing the tag.

In light of the principles and exemplary embodiments described and illustrated herein, it will be recognized that the exemplary embodiments can be modified in arrangement and detail without departing from such principles. Also, the foregoing discussion has focused on particular embodiments, but other configurations are contemplated. In particular, even though expressions such as "in one embodiment," "in another embodiment," "in a version of the embodiment" or the like are used herein, these phrases are meant to generally reference the range of possibilities of embodiments, and are not intended to limit the disclosure to the particular embodiments and configurations described herein. As used herein, these terms may reference the same or different embodiments that are combinable into other embodiments.

Similarly, although exemplary processes have been described with regard to particular operations performed in a particular sequence, numerous modifications could be applied to those processes to derive numerous alternative embodiments of the present disclosure. For example, alternative embodiments may include processes that use fewer than all of the disclosed operations, processes that use additional operations, and processes in which the individual operations disclosed herein are combined, subdivided, rearranged, or otherwise altered.

In view of the wide variety of useful permutations that may be readily derived from the exemplary embodiments described herein, this detailed description is intended to be illustrative only, and should not be taken as limiting the scope of the disclosure. What is claimed as the disclosure, therefore, are all implementations that come within the scope of the following claims, and all equivalents to such implementations. In the claims, means-plus-function and step-plus-function clauses are intended to cover the structures or acts described herein as performing the recited function and not only structural equivalents, but also equivalent structures. Thus, while a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A radio frequency identification (RFID) system, comprising:
   an RFID tag comprising:
      a plurality of information sources; and
      a beamforming network,
   wherein the RFID tag is configured to receive electromagnetic radiation from an RFID interrogator, the beamforming network is configured to direct the received electromagnetic radiation to a subset of the plurality of information sources, and the RFID tag is configured to transmit a response to the received electromagnetic radiation, the response based on the subset of the plurality of information sources to which the received electromagnetic radiation was directed.

2. The system of claim 1, wherein the RFID tag further comprises a plurality of antennas, the RFID tag being configured to receive the electromagnetic radiation via the plurality of antennas, and wherein the beamforming network and antennas produce a plurality of antenna radiation distribution patterns, each antenna radiation distribution pattern being associated with a respective one or more of the information sources.

3. The system of claim 1, wherein the RFID tag is further configured to receive the electromagnetic radiation at an angle of incidence relative to a fixed coordinate system at the tag, and the beamforming network is configured to direct the received electromagnetic radiation to the subset of the plurality of information sources based on the angle of incidence.

4. The system of claim 1, wherein the RFID tag is further configured to transmit the response to the received electromagnetic radiation (a) at an angle of incidence relative to a fixed coordinate system, the angle of incidence being an angle at which the electromagnetic radiation was received, and (b) in a direction opposite to a direction from which the electromagnetic radiation was received.

5. The system of claim 1, wherein the RFID tag comprises a plurality of faces, each face comprising one or more antennas and being associated with one or more of the information sources and a portion of the beamforming network.

6. The system of claim 1, wherein each information source comprises at least one of the following: an integrated circuit, a surface acoustic wave circuit, or a sensor.

7. The system of claim 1, wherein the beamforming network comprises one of the following: a microwave lens; a Rotman lens; a Ghent lens; a Luneberg lens; a Butler matrix; a Blass matrix; a combination of power combiners, power dividers, waveguides, and phase shifters; a combination of hybrid couplers, waveguides, and phase shifters; or a derivative of one of the preceding.

8. The system of claim 1, further comprising:
said RFID interrogator configured to transmit the electromagnetic radiation to the RFID tag and to receive the response to the electromagnetic radiation.

9. The system of claim 8, further comprising a mobile platform housing the interrogator.

10. The system of claim 8, wherein the interrogator is associated with logic configured to derive, from the response, information pertaining to one or more of the following: a position of the interrogator, and an orientation of the interrogator.

11. The system of claim 8, wherein each of the information sources includes an identification code, the response is encoded with the identification codes of the subset of the plurality of information sources to which the received electromagnetic radiation was directed, and the interrogator is associated with a mapping between the identification codes of the plurality of information sources and angles at which the responses are transmitted by the RFID tag.

12. A radio frequency identification (RFID) method, comprising:

receiving electromagnetic radiation from an RFID interrogator;
directing the received electromagnetic radiation to a subset of a plurality of information sources via a beamforming network within an RFID tag; and
transmitting a response to the received electromagnetic radiation, wherein the response is based on the subset of the plurality of information sources to which the received electromagnetic radiation was directed.

13. The method of claim 12, wherein the electromagnetic radiation is received at an angle of incidence relative to a fixed coordinate system, and the subset of the plurality of information sources to which the received electromagnetic radiation is directed is determined based on the angle of incidence.

14. The method of claim 12, wherein the response to the received electromagnetic radiation is transmitted (a) at an angle of incidence relative to a fixed coordinate system, the angle of incidence being an angle at which the electromagnetic radiation was received, and (b) in a direction opposite to a direction from which the electromagnetic radiation was received.

15. The method of claim 12, wherein the response to the received electromagnetic radiation is encoded with the identification codes of the subset of the plurality of information sources to which the received electromagnetic radiation was directed.

16. The method of claim 12, further comprising:
transmitting the electromagnetic radiation from an RFID interrogator; and
receiving the response to the received electromagnetic radiation from the RFID tag.

17. The method of claim 16, further comprising deriving, based on the received response to the received electromagnetic radiation, information pertaining to a position or an orientation of an entity that received the response to the received electromagnetic radiation, relative to an entity that transmitted the response to the received electromagnetic radiation, or of an entity that transmitted the response to the received electromagnetic radiation, relative to an entity that received the response to the received electromagnetic radiation.

18. A radio frequency identification (RFID) system, comprising;
an RFID tag comprising:
a plurality of information sources; and
a passive beamforming network,
wherein the RFID tag is configured to receive electromagnetic radiation from an RFID interrogator, the beamforming network is configured to direct the received electromagnetic radiation to a subset of the plurality of information sources, and the RFID tag is configured to transmit a response to the received electromagnetic radiation, the response based on the subset of the plurality of information sources to which the received electromagnetic radiation was directed.

19. The system of claim 18, wherein the RFID tag further comprises a plurality of antennas, the RFID tag being configured to receive the electromagnetic radiation via the plurality of antennas, and wherein the passive beamforming network and antennas produce a plurality of antenna radiation distribution patterns, each antenna radiation distribution pattern being associated with a respective one or more of the information sources.

20. The system of claim 18, wherein the RFID tag is further configured to receive the electromagnetic radiation at an angle of incidence relative to a fixed coordinate system at the RFID tag, and the passive beamforming network is configured to direct the received electromagnetic radiation to the subset of the plurality of information sources based on the angle of incidence.

21. The system of claim 18, wherein the RFID tag is further configured to transmit the response to the received electromagnetic radiation (a) at an angle of incidence relative to a fixed coordinate system, the angle of incidence being an angle at which the electromagnetic radiation was received, and (b) in a direction opposite to a direction from which the electromagnetic radiation was received.

22. The system of claim 18, further comprising:
   said RFID interrogator configured to transmit the electromagnetic radiation to the RFID tag and to receive the-response to the electromagnetic radiation from the RFID tag wherein the interrogator is associated with logic configured to derive, from the response of the RFID tag, information pertaining to one or more of the following; a position of the interrogator, and an orientation of the interrogator.

* * * * *